Figure 1:
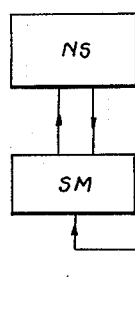

Feb. 25, 1958 A. BONI 2,824,694
ANALYTIC CALCULATING MACHINE
Filed Sept. 6, 1950 10 Sheets-Sheet 1

Inventor
ALESSANDRO BONI

Bertram Ottinger
Attorney

Feb. 25, 1958
A. BONI
2,824,694
ANALYTIC CALCULATING MACHINE
Filed Sept. 6, 1950
10 Sheets-Sheet 2
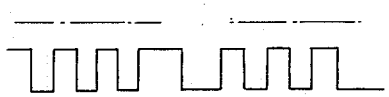
FIG. 7
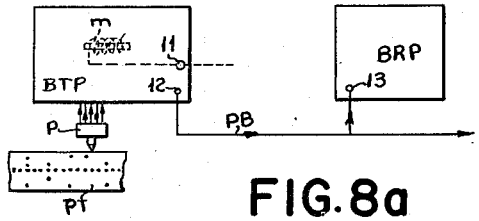
FIG. 8a
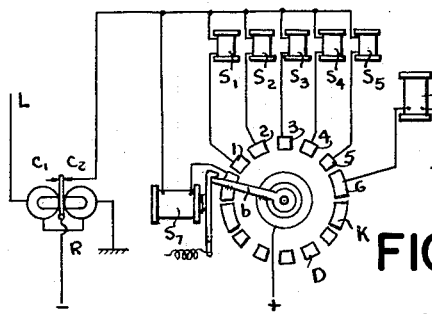
FIG. 8b
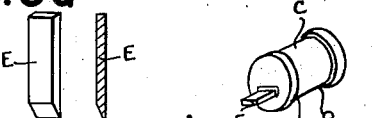
FIG. 9a
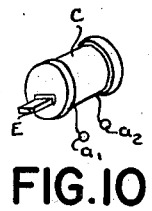
FIG. 9b
FIG. 10
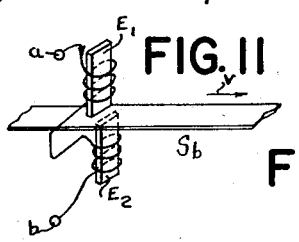
FIG. 11
FIG. 12
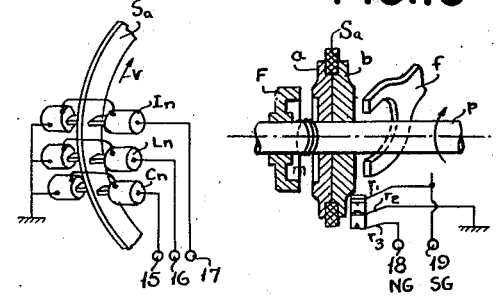
FIG. 13    FIG. 14
FIG. 15
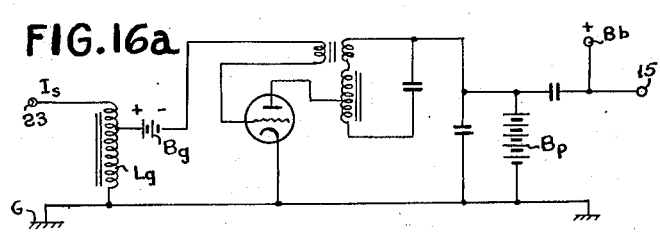
FIG. 16a
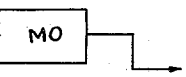
FIG. 16b → MO → AM → FIG. 17b
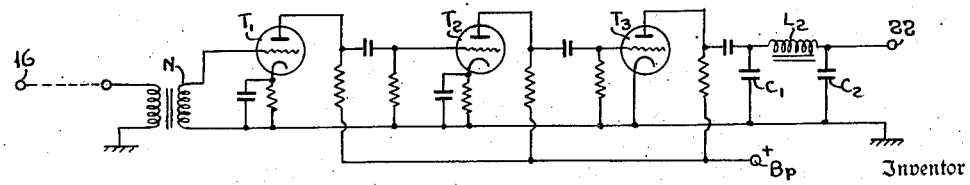
FIG. 17a
Inventor
ALESSANDRO BONI
By
Bertram Ottinger
Attorney Feb. 25, 1958   A. BONI   2,824,694
ANALYTIC CALCULATING MACHINE
Filed Sept. 6, 1950   10 Sheets-Sheet 3

Inventor
ALESSANDRO BONI
By
Bertram Ottinger
Attorney

Feb. 25, 1958 A. BONI 2,824,694
ANALYTIC CALCULATING MACHINE
Filed Sept. 6, 1950 10 Sheets-Sheet 4
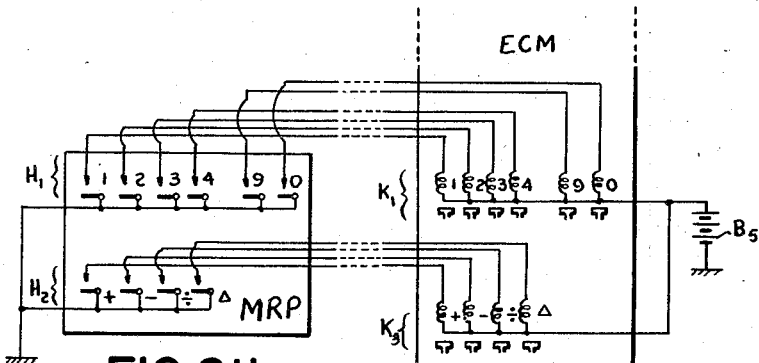
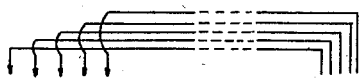
FIG.21b  FIG.21a
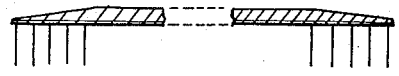
FIG.21c  FIG.21d
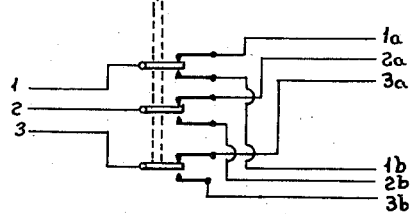
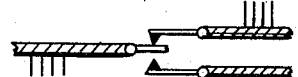
FIG.21e  FIG.21f
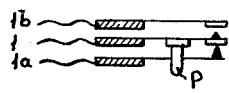
FIG.21g
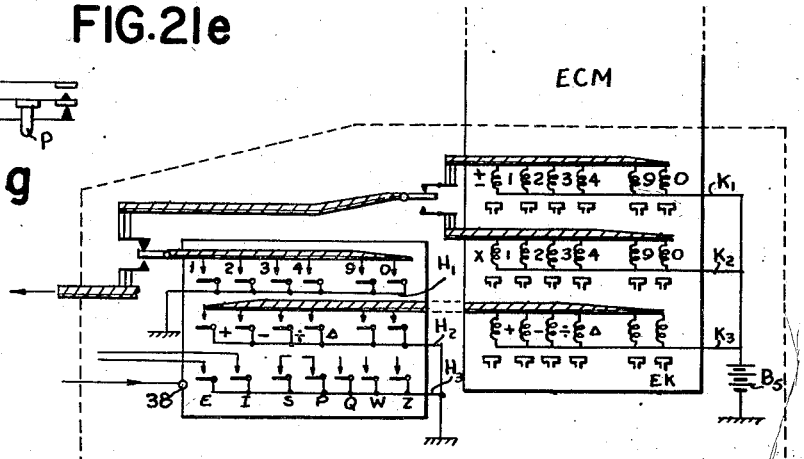
FIG.21h
Inventor
ALESSANDRO BONI
By Bertram Ottinger
Attorney

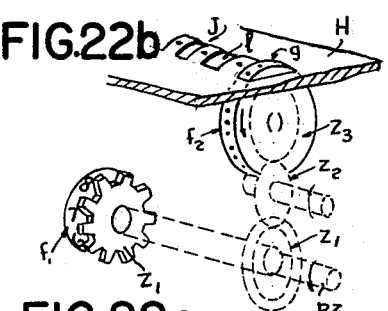

Feb. 25, 1958
A. BONI
2,824,694
ANALYTIC CALCULATING MACHINE
Filed Sept. 6, 1950
10 Sheets-Sheet 6
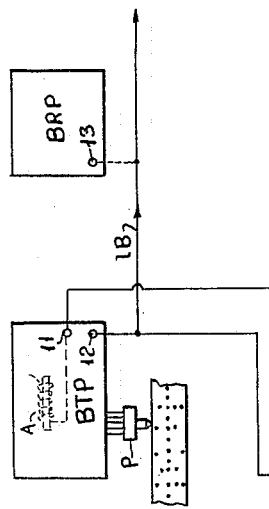
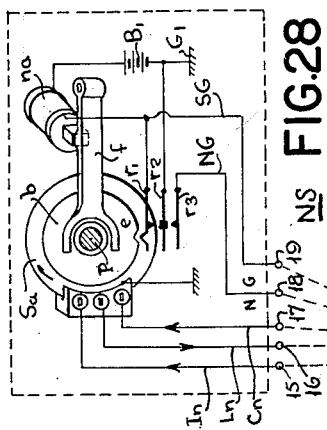
Inventor
ALESSANDRO BONI
Bertram Ottinger
Attorney Feb. 25, 1958 A. BONI 2,824,694
ANALYTIC CALCULATING MACHINE
Filed Sept. 6, 1950 10 Sheets-Sheet 7

Inventor
ALESSANDRO BONI

By Bertram Ottinger
Attorney

Inventor
ALESSANDRO BONI

Inventor
ALESSANDRO BONI

United States Patent Office 2,824,694
Patented Feb. 25, 1958

2,824,694

ANALYTIC CALCULATING MACHINE

Alessandro Boni, Rome, Italy

Application September 6, 1950, Serial No. 183,367

14 Claims. (Cl. 235—61.6)

The present invention, of which this application is a continuation-in-part of U. S. patent application Serial No. 12,051, filed February 28, 1948, now abandoned, which is cognate with Italian Patent No. 385,130 dated September 10, 1940, relates to an analytic calculating machine, and more particularly to a machine functioning automatically and controlled by a succession of recorded signals, with the object of effecting a series of calculations according to a predetermined program and repeated many times, said program being of the type required by mathematical methods of numerical integration of differential equation systems known as the step by step methods.

The numerical integration methods can be made as precise as required, while methods of mechanical integration which employ apparatus of the planimeter type, have a limited precision, such as, for instance, the differential analyzer of J. Bush, described in the "Journal of the Franklin Institute," No. 212, page 447 (1931).

The mathematical theory of these methods is described in the following books:

E. T. Whittaker and G. Robinson: "The Calculus of Observations," London, 1924, edited by Blackie and Son Ltd.:

Especially chapter XIV, pages 363–367: The numerical solution of differential equations—the method of J. C. Adam is here described and other methods are referred to, such as Runge "Math. Ann. 46—1895, page 167" and Kutta "Zeits. f. Math. und Phys. 46—1901, page 435."

Forest Ray Moulton: "New Methods in Exterior Ballistics," Chicago, Ill., 1926, edited by The University of Chicago Press:

Especially chap. III, pages 60–78: Numerical solution of differential equations, and chap. V, pages 142–171. The method of Cauchy-Lipchitz is described on pages 162–165.

H. Levy and E. A. Baggott: "Numerical studies in differential equations," London, 1934, edited by Watts & Co.:

Especially chaps. III and IV, pages 63–140, where the methods of Frobenius, Euler and Picard are described.

In relation to the present invention, one may merely say regarding the above mathematical theories, without describing them in detail, that in general a first group of numbers is given, on which a series of operations is to be made thus getting a second group of numbers. The same series of operations is again made on this second group of numbers and this operation is repeated again and again as many times as may be required. Analogous mathematical procedures, called "iteration processes" and originated to Newton and Coates, are employed by solve algebraical equation systems of any degree. The rules of Simpson and of the trapezoids for calculating a surface also come within the ambit of such repeated calculation procedures.

OBJECTS OF THE INVENTION

A first object of the present invention is to supply the means of control whereby a group of ordinary calculating machines will automatically execute a whole series of operations pre-planned in each case with mathematical criteria, and will repeat said series as many times as required.

A second object is to provide the means of recording the initial numerical data and some of the results supplied by the calculating machines when executing the successive series of calculations.

A third object, with particular reference to the means of control listed under the "first object," is to provide a punched tape having code signals decipherable by the means used in teleprinter sets, said code signals governing the operation of groups of ordinary calculating machines while also calling up numbers from the numbers storage magazine on the basis of an index number, feeding said numbers to the calculating machines and governing the recording of the results given by the calculating machines.

A fourth object, with particular reference to the operation of the numbers storage magazine referred to in the second object, consists in recording the numbers magnetically by the low frequency carrier system modulated by code signals, such recording being effected on several steel tapes having the form of circular rings, as many tapes being employed as there are numerical data and results to be recorded. Together with this object of the magnetic recording, it is necessary to provide for the reading of the magnetically recorded signals, by transforming them into current pulses, which thereafter are amplified and rectified.

A fifth object is to provide control, by means of electric currents, automatically, of the keys of the ordinary electric calculating machines, both as regards the inscription of the numbers as well as the execution of the various operations, $+$, $-$, $\times$, $\div$ between the numbers themselves. These keys are actuated by electromagnets, whose currents are controlled by a teleprinter, which receives the signals of the punched tape and the signals of the magnetic reading of the steel rings.

A sixth object is to provide means for reading the results obtained by the ordinary calculating machines, by having current impulses in teleprinter code correspond to the various numbers. These currents are employed for modulating the low frequency carrier current, referred to in the fourth object.

A seventh object is to provide devices to select the steel-tape ring on which required numerical data is recorded and to select the ring on which each numerical result obtained from the calculations are to be recorded. These selecting devices are of a switching machine type.

An eighth object is to provide an automatic change of electrical connections as a result of signals sent by the control tape and by the numbers recorded and read. These signals operate relays, whose armatures operate the opening and closing of the contacts, for establishing the required connections.

A ninth object is to provide recording means having the object of delaying control, over a period of time, of the execution of operations by various electric calculating machines.

Other objects and their description will appear in the following text.

LIST OF FIGURES

Fig. 1.—This figure shows a block diagram of the principal parts forming the analytic machine.

Figure 2:
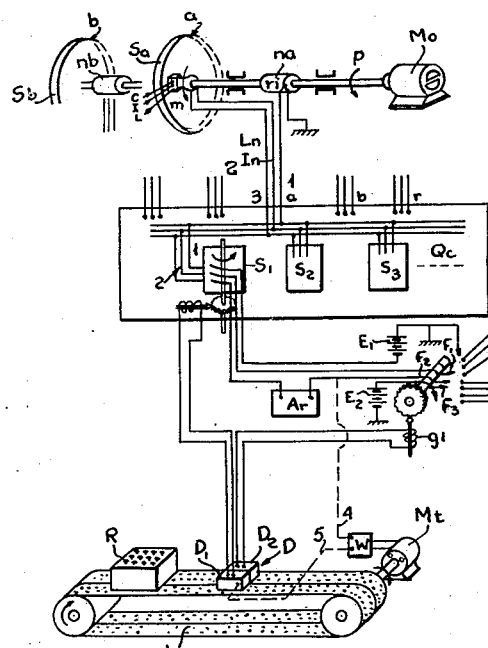

Fig. 2.—A general schematic view of the connections between the various parts of the analytic machine.

Figure 3:
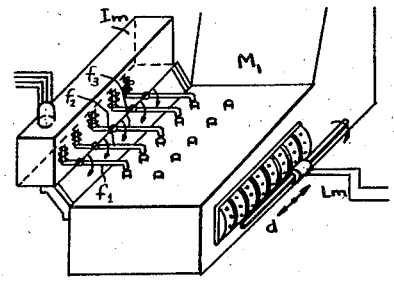

Fig. 3.—A diagrammatic view of the accessory "inscribing" and "reading" units with which an ordinary calculating machine must be supplied, and which form part of the analytic machine as a whole.

Figure 4:
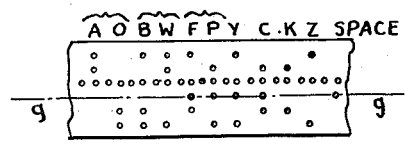

Fig. 4.—A view of part of a teleprinter code alphabet.

Figure 5:
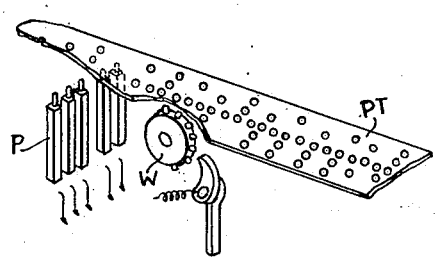

Fig. 5.—A view of the punched paper tape and the associated "reading" or exploring device and advancement mechanism.

Figure 6:
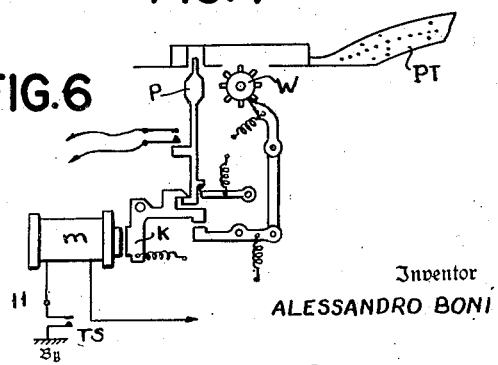

Fig. 6.—Another view of the devices shown in Fig. 5, with the addition of the circuit of the electromagnet governing operation of said devices.

Fig. 7.—A diagram showing the form of electrical signals transmitted by a teleprinter machine.

Fig. 8a.—A schematic figure representing the transmission devices associated with the control tape of the analytic machine.

Fig. 8b.—A schematic view of the principal circuits of a receiving teleprinter set.

Figs. 9a and 9b.—A perspective view and a section of the poles employed in magnetic recording on steel tape.

Fig. 10.—A view of the pole coils used in magnetic recording and reading.

Fig. 11.—A perspective view of a section of steel tape with its asociated magnetic recording or reading device.

Fig. 12.—A perspective view of a circular steel ring used for recording.

Fig. 13.—A perspective view of the magnetic heads used for recording steel rings.

Fig. 14.—A sectional view of the mechanism which drives the steel ring.

Figs. 15a, b, c, d, e.—The various phases of the recording signals; the carrier frequency, the modulation, the modulated carrier, the received signal after being rectified, the same after being filtered.

Figs. 16a and 16b.—The circuit daigram and block diagram of a modulated oscillator.

Figs. 17a and 17b.—The circuit diagram and block diagram of an amplifier, with rectifier and filter.

Figure 17C:
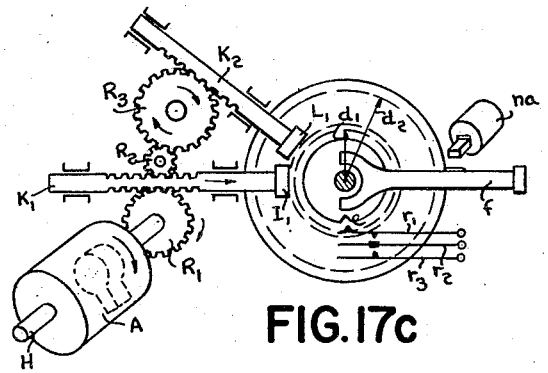
Figure 17D:
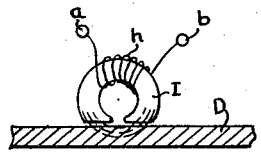

Fig. 17c and 17d.—Schematic views of a device for the magnetic recording of several numbers on corresponding concentric circles of a steel disc.

Figure 18:
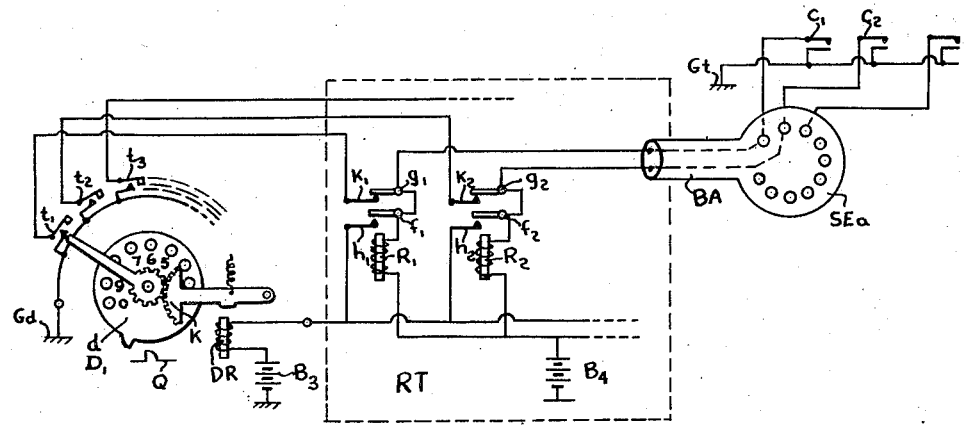

Fig. 18.—A view of the electrical circuits to render dialling automatic.

Figure 19:
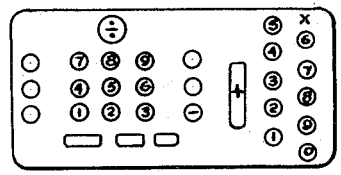

Fig. 19.—A plan view of the reduced keyboard of an electric calculating machine.

Figure 20:
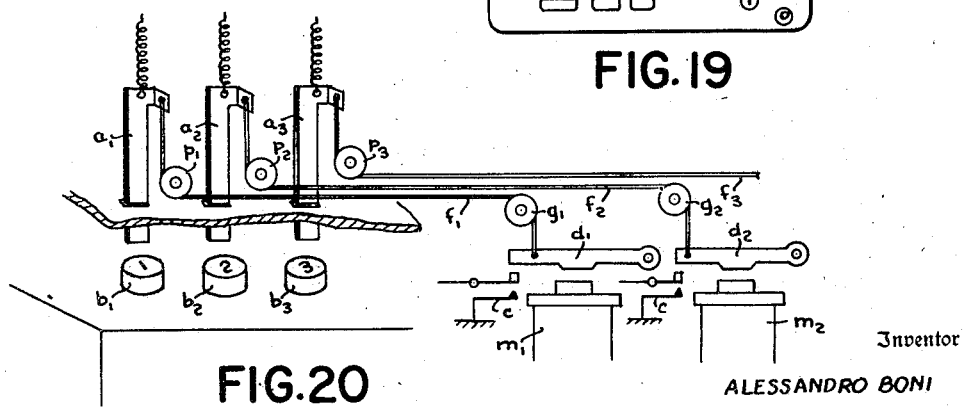

Fig. 20.—A view of the electromechanical mechanism to operate the keys on the keyboard shown in Fig. 19.

Figs. 21a, b, c, d, e, f, g, h.—Different schematic views and block diagrams of the electro-mechanical operation of the keyboard shown in Figs. 19 and 20, the control being effected by electric contacts, which are closed by the type-bars of a receiving teleprinter.

Figs. 22a, b, c.—Different views of the drums connected to the various wheels of the totalizing mechanism in calculating machines, and the manner in which they are supplied with teleprinter code markings or holes.

Fig. 23.—An external view of the code signals of the drums shown in the preceding Fig. 22.

Fig. 24.—A perspective view of the devices employed for the advancement of the means for exploring the code signals on said drums.

Fig. 25.—The diagram of electric circuits of said advancement devices.

Figs. 26a, b, c.—A view and the indicative drawing of the electric circuits of two relays which switch the electric connections.

Figs. 27 a, b, c, d, e.—Different views of the type-bars of a teleprinter receiver and the associated electric contacts operated by said type-bars.

Fig. 28.—The electric circuit diagram of the devices for rotating the steel rings and their associated recording, reading and cancelling magnetic heads.

Fig. 29.—A diagram of the electric circuits of the switching machine.

Fig. 30.—A general diagram of the electric circuits which operate the analytic machine.

Fig. 31.—A view of the successive letters and numbers, corresponding to perforations of the punched tape, for controlling the operation of division between two numbers and the recording of the result.

Fig. 32.—A view of the successive letters and numbers, corresponding to perforations of the punched tape, for the recording of the initial numerical data in the numbers storage magazine.

Figure 33:
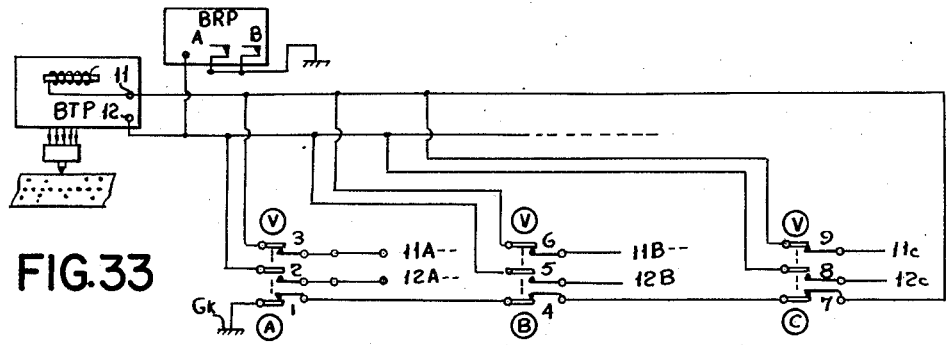

Fig. 33.—A diagram of the electric circuits employed in controlling more than one ordinary calculating machine.

Figure 34:
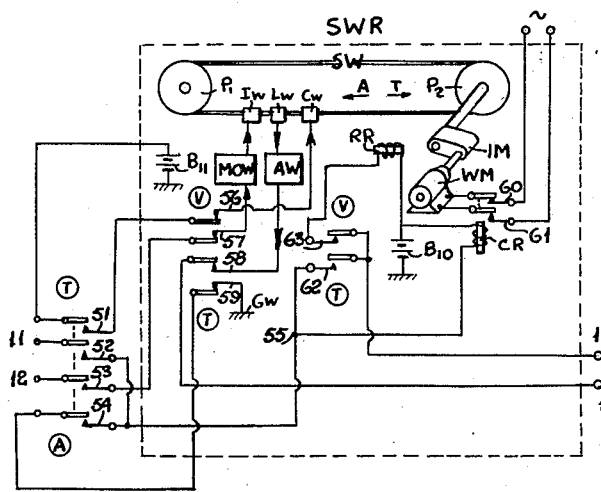

Fig. 34.—A diagram of the electric circuits in an auxiliary device for recording magnetically on steel wire, to be associated with a calculating machine.

Figure 35:
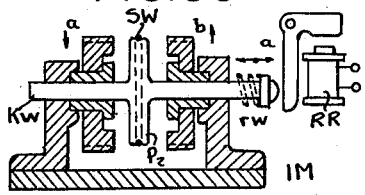

Fig. 35.—A sectional view of a device for reversing the direction of movement of the steel wire.

Figure 36:

Fig. 36.—A perspective view of a device to change the velocity of movement of the steel wire.

Figure 37:
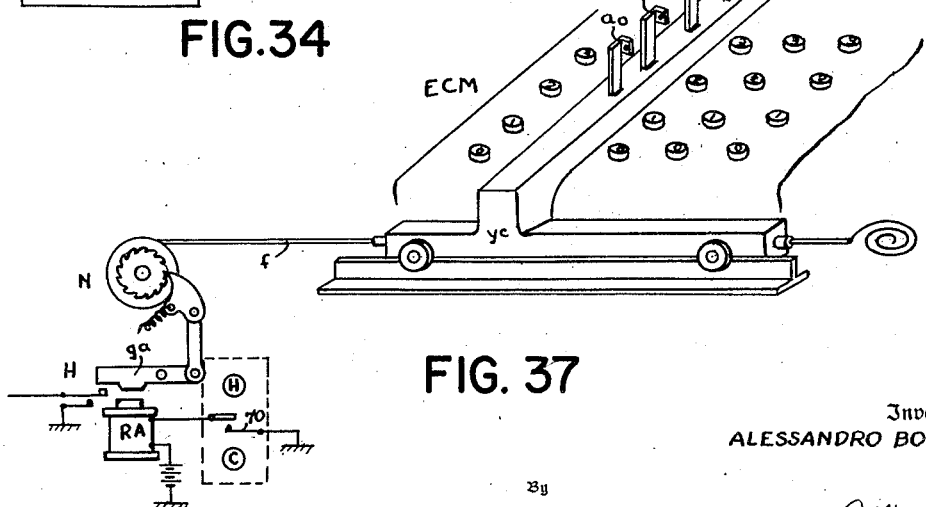

Fig. 37.—A view of the devices and electric circuits employed in the electromechanical inscription on the keyboard of a calculating machine of the "complete keyboard" type.

Figure 38A:
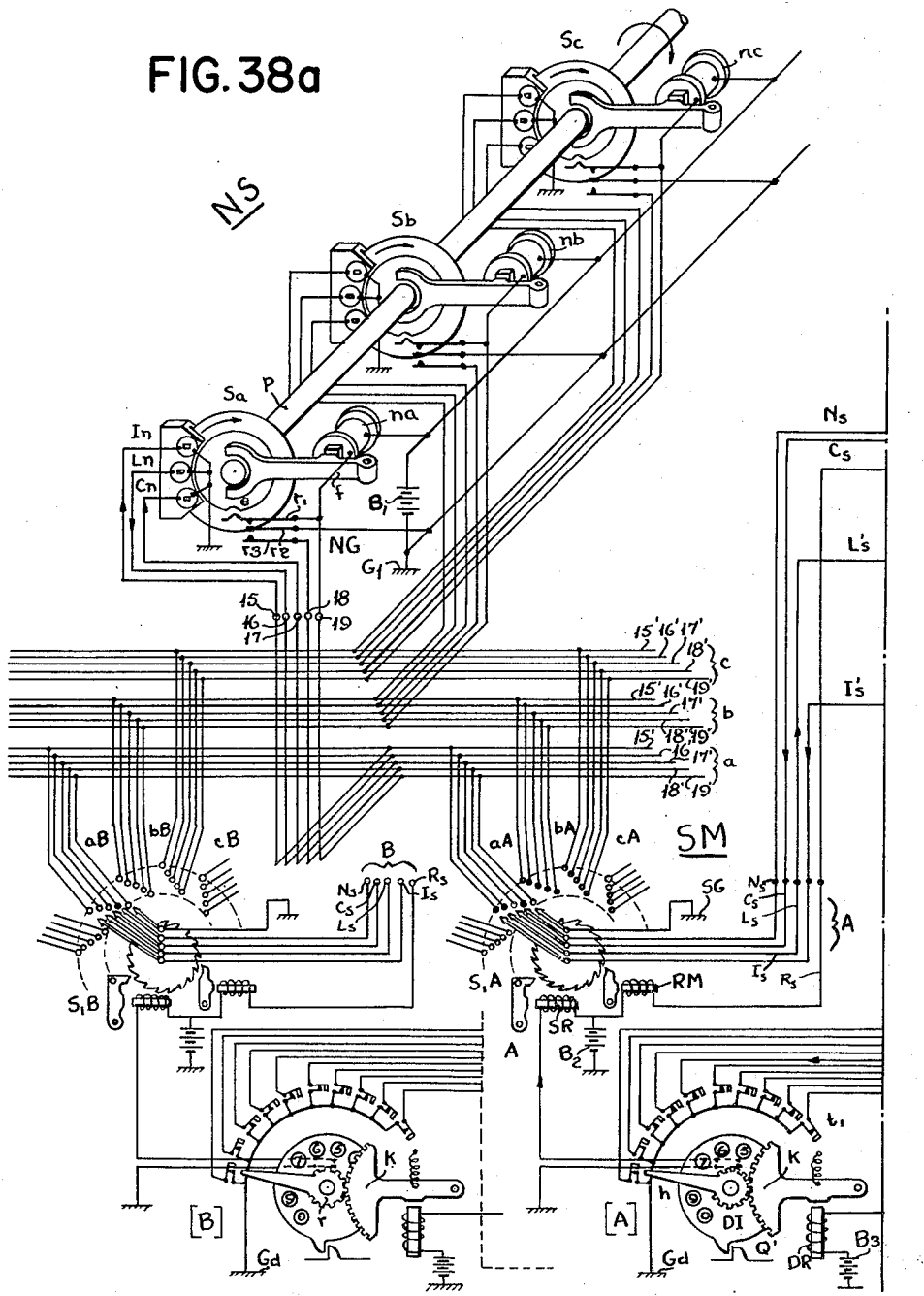
Figure 38B:
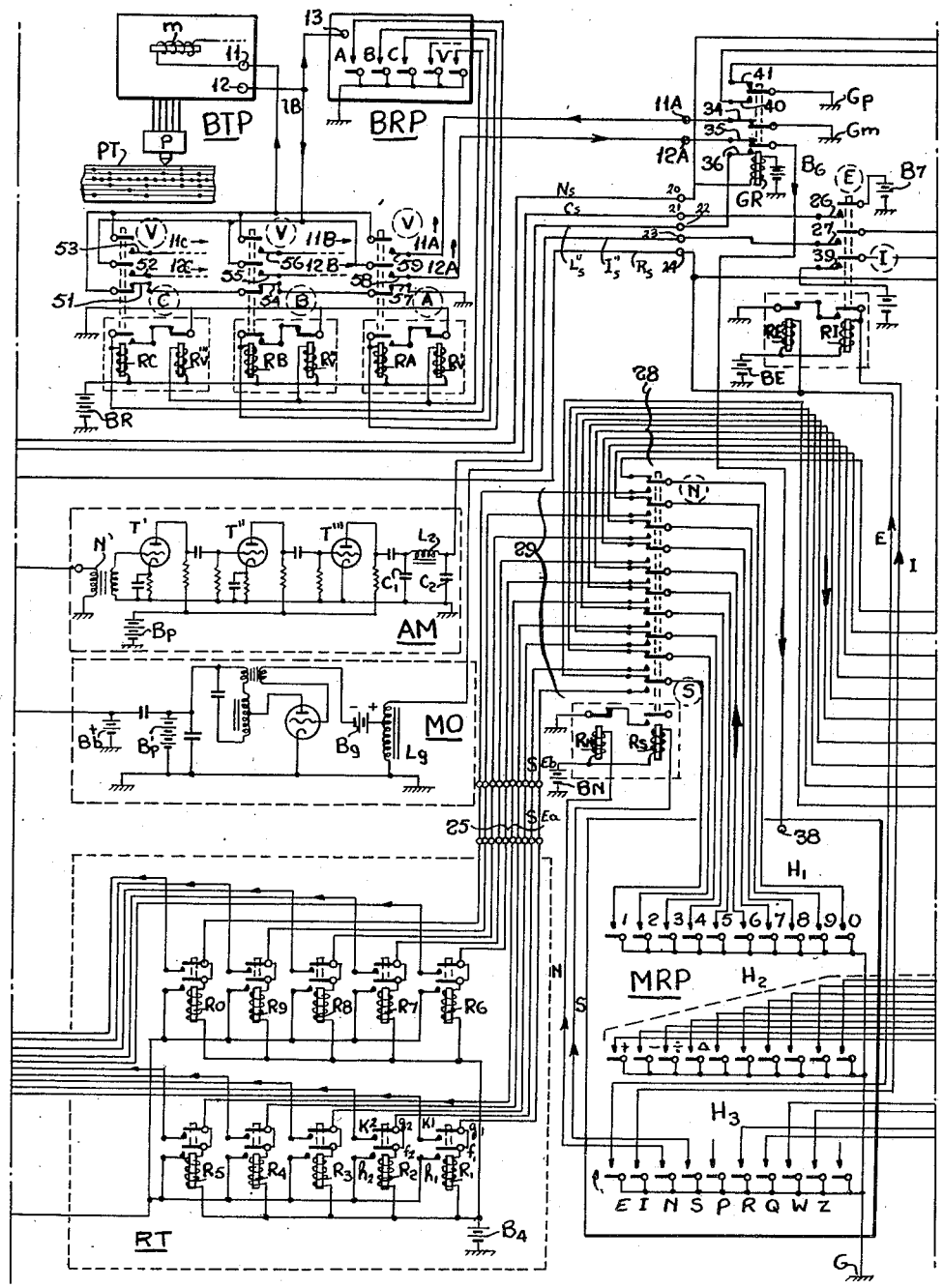
Figure 38C:
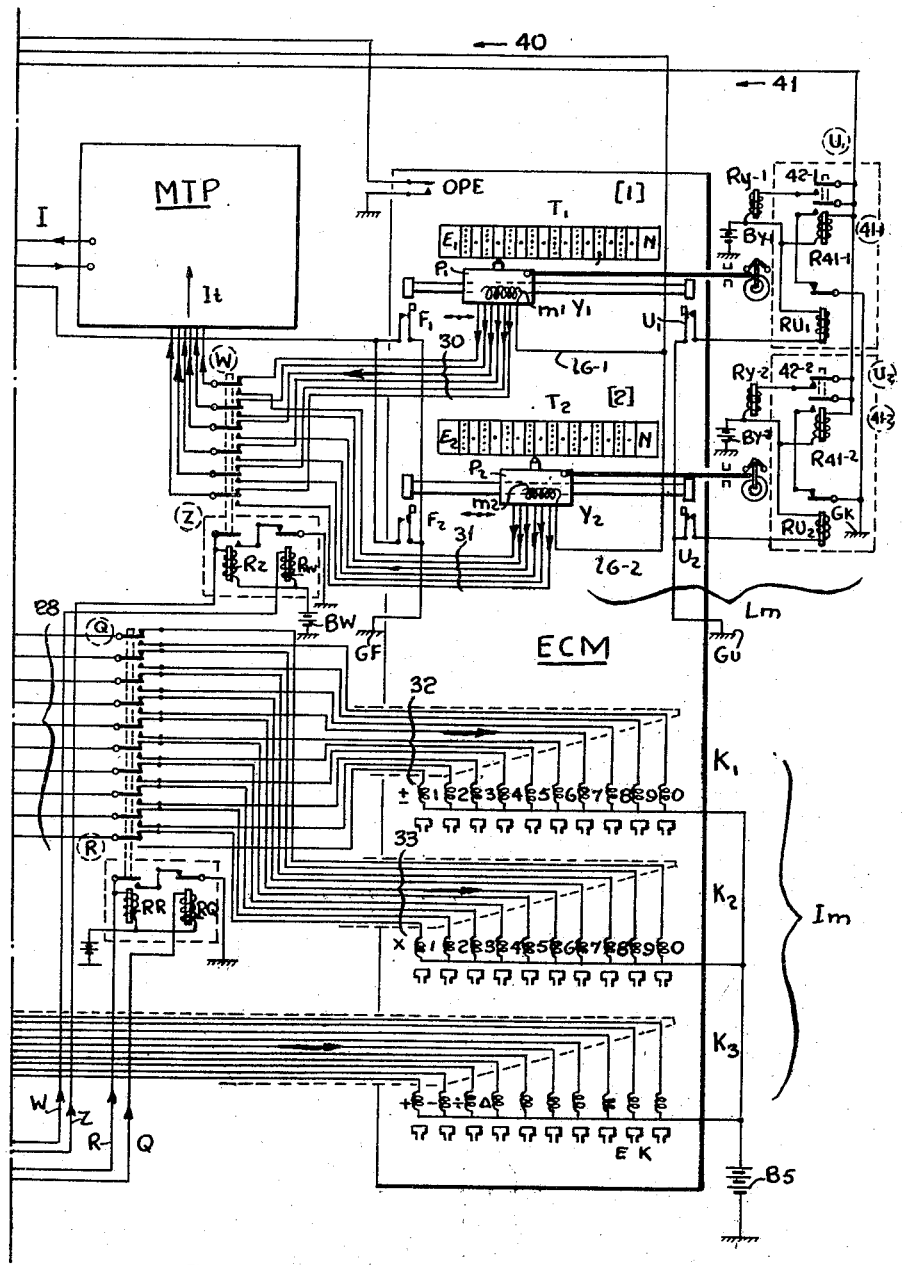

Figs. 38a, 38b and 38c.—When placed side by side, an electric circuit diagram of the entire machine.

GENERAL DESCRIPTION

The calculating machine having the aims described above will hereafter be called, as far as the whole machine is concerned, the "analytic machine," while the various parts which form it, as shown in Fig. 1, are the following: CT=control tape; NS=numbers storage magazine; SM=switching machine; GR=group of connecting relays; M=group of calculating machines (each consisting essentially of three parts: $I_m$=inscription device; $L_m$=reading device, and ECM=an ordinary electrical calculating machine).

The general objects to be attained and the connections between the various devices shown in Fig. 1 will now be described with reference to Fig. 2. The control tape is any means on which code signals are recorded. Such signals, through deciphering means, govern the operation of the analytic machine. The best type of tape recording for use in the embodiment of the present invention is the punched paper tape, $t1$, like the tapes used in teleprinter machines. These tapes can be easily prepared and inspected. The perforation is performed with reference to the series of operations pre-planned with mathematical criteria, according to the particular problem to be solved; the tap runs in a closed circuit in the case of a repeated series of operations; the tape is opened when initial numerical data are to be recorded in the numbers storage magazine. An ordinary punching device is indicated at R, its operation being effected by means of keys as in typewriters. This perforator is a part of the devices of the ordinary teleprinter machines. D is a device for transforming the code signals into current impulses, just like an ordinary automatic teleprinter transmitter. The tape may carry more than one line of signals, in which case more than one decipering device are used, as indicated in D1 and D2. The punched tape is driven by a motor $M_t$, the operation of which is governed by the switch W. Other means of driving the punched tape will be indicated below.

In the embodiment of the present invention the storage of numbers is effected by means of the magnetic recording system invented by Poulsen (1899) and perfected by Stille and others, a system in common use for broadcasting, press services, and other services. Numerical data and results are individually recorded on separate steel-tape rings, $S_a$, $S_b$, etc. The three couples of poles used for cancelling C, recording I and reading L, may, if required, serve several of the numerical data steel tape rings in order to obtain a saving in the amount of machinery involved; but in the present description principally each group of pole couples is associated with a single number only. Relative motion between the steel-tape ring and the pole pieces is provided by the motor $M_o$, which operates continuously, its motion only being transmitted to the particular number band required when a magnetic clutch $na$ is excited by a current sent to said clutch by the punched tape reading device and through the switching machine. Each recording ring is served by its allied clutch: $S_a$ by $na$, $S_b$ by $nb$, etc. and each ring, magnetic head and clutch combination corresponds to a single index number which can therefore be selected by the switching machine. The magnetic heads and the clutches are connected to the switching machine board $Q_c$ (Fig. 2) by their respective lines $L_n$, $I_n$ and line $l$ (for $na$); the lines are connected in multiple on the contact banks of the selectors or connectors S1, S2, S3, etc., each selector being associated with one of the ordinary electric calculating machines, which are indicated for brevity by M1, M2, M3, etc. in Fig. 2, and which correspond to ECM of Fig. 1.

The operations of selection at $Q_c$ are governed by current pulses coming from the deciphering devices D or other similar mechanisms. This selection serves to connect the lines of a particular number tape ($S_a$ for instance) with the lines to a selector S1, S2, etc. and therefore to its associated calculating machine M1, M2, etc.

The group of connecting relays indicated by CR in Fig. 1 will be specified later, and now it is indicated schematically in Fig. 2 by the selecting device $g1$, associated batteries E1, E2, etc., amplifiers $A_p$, but in addition it also includes other switches and circuits which form part of the devices $I_m$ and $L_m$ associated with the calculating machines M1, M2, etc. as will be specified later.

The electric calculating machines ECM (Fig. 1) are considered to be of the type having automatic control of all calculating operations ($+$, $-$, $\times$, $\div$) when the correct key is pressed, said pressure being transmitted, as in Fig. 3, by levers $f1$, $f2$, $f3$, etc. moved by the armatures of the electromagnets grouped at $I_m$, which also serve as inscription devices on the ECM with the object of providing the required numerical data which is to enter the calculating machine. The electromagnets at $I_m$ are excited by corresponding circuits whose contacts are closed by the levers of a teleprinter receiver which thus transforms the code impulses received into movements of the keys of the ECM. It is intended that the inscription device $I_m$ be formed by said electromagnets and by the teleprinter receiver, which controls the closing of the circuits of the electromagnets, as will be specified later, with reference to Figs. 19, 20, 21a to 21h, and 27a to 27e. The teleprinter receiver of $I_m$ is indicated by MRP.

The electric calculating machines of Figs. 1, 2, 3 are also provided with reading devices $L_m$ which have the object of transforming the various digit numbers of the results furnished by the ECM into current pulses in code; in the embodiment of the present invention the devices $L_m$ are similar to a teleprinter transmitter because the drums of the totalizers and of the other results carry the numbers in the form of code holes. It is also possible, with this system, to write the results if required on a tape or on pages by means of the printing means of a teleprinter receiver connected to the teleprinter transmitter of the devices $L_m$.

Before commencing the calculating operations on the electric calculating machines, the initial numerical entries are recorded successively and indexed by a number on a punched paper tape by perforator R (Fig. 2). This "initial data" punched tape is not a closed loop. The transmitting device D and selecting mechanism S1, S2, etc., bring the numerical data to the steel tapes $S_a$, $S_b$, etc., in correspondence with the index number. Operation of the various parts is explained more fully in succeeding sections.

CONTROL TAPE

The teleprinter alphabet can be any modification of the Baudot five-unit system (France—1874), a part being shown in Fig. 4; five current pulses are needed for each letter in synchronised systems and seven in start-stop systems. Either one or the other standard system may be employed in the present invention, the start-stop system being preferred.

In this system two additional pulses of start and stop are required for each character; the code holes of the tape are always five in number. The pluses are sent successively on the line by the action of a distributor, which is associated with an ordinary electric motor, the speed of which is controlled by a governor. The brushes of the distributor are connected to the shaft of the motor by flexible couplings. The actuation of a release magnet by the start pulse withdraws the stop and permits the brushes to make one revolution, during which the sending and receiving of a group of current pulses of a character occur, and at the end a stop magnet is operated. We do not describe the details of these systems because they are known; we indicate only the particulars which serve to clarify definitions and names used in the specifications.

In Fig. 4, the small holes in a continuous row are advancement holes to move the tape forward. In Fig. 5 the five selector pins P of a standard teleprinter transmitter close a contact when a punched hole in the tape corresponds to a pin, thus closing a circuit which supplies current to the segmented ring of a distributor which is part of a teleprinter transmitter, and whose brushes send successive current pulses along the outgoing line (as in Fig. 7 which shows the letters R and Y in a start-stop system). The toothed wheel W (Figs. 5 and 6) moves the tape forward step by step, rotation of W being effected by the armature K (Fig. 6) when electromagnet $m$ is energized at each successive step. If any of the selecting pins are raised, the action of the armature will lower them, an instant before the advancement of the tape.

In the following description, the teleprinter transmitter associated with paper tape PT (control tape of the entire analytic machine) will be indicated for brevity as BTP and it will be represented as in the schematic diagram Fig. 8a. Devices P, W, $m$ and K are to be found in ordinary teleprinter machines and may be employed without variation in the present invention.

The electromagnet $m$ in Fig. 8a is the same as in Fig. 6 and it must be remembered, in the following description, that only when terminal 11 of Fig. 6 is connected to an external circuit and during the time that contact TS is closed, electromagnet $m$ is connected to ground and can therefore be energized, whereas during the time that contact TS is open, the circuit between electromagnet $m$ and its ground return path is open and therefore the tape cannot be moved forward and will remain indefinitely in one position.

Current pulses from BTP are sent along line $l_B$ attached to terminal 12 in Fig. 8a. A terminal (13) on a teleprinter receiver BRP is tapped into line $l_B$ (Fig. 8a) coming from control tape PT. BRP has the object of deciphering the signals transmitted by BTP both as a check on the transmission itself, and also to effect some control operations as will be specified later in the description.

In Fig. 8b is shown very schematically a typical and known device used to distribute the incoming current impulses of BRP to the proper selector magnets; in this figure it is usual to name: L, line, R line relay, $c1$ and $c2$ spacing and marking contacts, $s1$, $s2$, $s3$, $s4$, $s5$ printer selecting magnets, $s6$ the sixth-pulse magnet, $s7$ the start magnet, $b$ the brush arm, D the segmented distributor, $k$ the start segment.

The selecting magnets provide for the movements of selector bars (such as indicated by b1 to b5 in successive Fig. 27e), which by their rows of slots permit the operation of the type-bar corresponding to the transmitted code pulses group.

The segments of the receiving distributor D have a length less than that of the transmitter segments, so as to employ only the central portion of the received pulses, each of them being effected by a certain distortion at the start and the finish, caused by the transmission.

NUMBERS STORAGE MAGAZINE

As is well known, a piece of steel may be permanently magnetized by a magnetic field through the hysteresis effect. For recording purposes a thin steel tape is employed and sometimes a steel wire which, however, does not give as good results as the tape. The pole pieces used to magnetize or "read" the magnetization on the tape are normally of the form shown in Figs 9a (perspective view) and 9b (section) and are made of soft iron. These pole pieces E, as shown in Fig. 10, are provided with small coils C which, in the case of the recording head, carries the magnetizing current and in the case of the reading head carries the current induced by the magnetization on the tape itself. In Fig. 11 the steel tape $sb$ moves with a velocity $v$ between the poles E1 and E2. If an electric current of sufficient intensity is sent into the coil through terminals $a$ and $b$, the electric impulses will be recorded on the tape in the form of a residual magnetism varying in intensity along the tape in direct proportion to the variations in intensity which passed through the coil. A similar couple of pole pieces and similar coils are employed for reading the magnetic signals recorded on the tape since the latter, as it moves between the pole pieces, sends a variable flux of magnetic induction through the pole coils, thus creating an induced current. The "reading" coils usually have more turns of finer wire than the "recording" coils. In order to record a number of ten digits in teleprinter cipher, a tape length of approximately ten inches is sufficient. In the embodiment of the present invention the tape for each number has been given the form of a closed ring $S_a$ (Fig. 12) obtained by making a hole in the center of a disc of thin steel approximately 4 inches in diameter. Fig. 13 shows the relative movement between the ring $S_a$ and the three couples of poles, of which the couple $I_n$ is employed for recording, the couple $L_n$ for reading, and the couple $C_n$ for cancelling which is effected by the magnetic saturation of the ring by an intense field produced by strong currents in the $C_n$ coil. It does not matter whether the poles are fixed and the ring moves between them, or whether the ring is fixed and the poles move along it. In the present case the poles are stationary and the ring turns. To obtain the required movement, the ring is mounted, as shown in Fig. 14, between the two discs $a$ and $b$ of non-magnetic material which can turn freely on a shaft $p$, said shaft being kept in continuous rotation by a motor as shown previously in Fig. 2 by the motor $M_o$. A ring F (Fig. 14), fastened solidly to the shaft, turns with it and will also turn ring $S_a$ when fork $f$ overcomes the resistance of the spring and pushes $a$ against F, these two pieces thus acting as a clutch. Fork $f$ is pulled against discs $a$ and $b$ by the electromagnet "$na$" of Fig. 28. In Fig. 14 the air gap between F and $a$ is shown very large for clearness, but in practice it is very small.

Operation of the ring is as follows:

There are two electric contacts between three spring arms $r1$, $r2$, $r3$ as shown in Fig. 28; the arm $r1$ having a tooth which is held by spring tension in a notch $e$ on the edge of piece $b$ (Figs. 14 and 28). When this tooth is in the notch, the contacts between the spring arms are open but should the ring turn, the tooth is forced out of the notch thus closing the two contacts. By closing an external circuit SG (shown in Fig. 29) the terminal 19 (Figs. 14 and 28) is connected to ground, thus grounding the return path of electromagnet $na$ which becomes energized and pulls fork $f$ over against the ring which is thus started turning by its friction against the continuously turning piece F of Fig. 14. As the ring starts turning, the tooth on spring arm $r1$ is forced out of its notch $e$, thus closing the contacts between springs $r1$, $r2$, $r3$ (Fig. 28), and since $r2$ is connected to ground G1, the other two spring arms, $r1$ and $r3$ are now grounded. In this manner, electromagnet $na$ is connected to ground G1 during the rotation of the ring $S_a$ and will remain energized until the ring has made a complete turn and the tooth drops into the notch again, breaking the contact. Thus the ground connection SG (which we will call "selector ground") established by circuit SG is no longer required in order to energize the magnet once the ring has started turning, and switch SG may immediately be opened again, as will be said later with reference to Fig. 29. It will thus be seen that a single current pulse is sufficient to start the ring which will then make one complete revolution before stopping.

It should also be noted that during operation, the contact between spring arms $r2$ and $r3$ remains closed and terminal 18 is therefore connected to ground. This will be called the "terminal of the ground number" or NG.

When the ring has made a complete turn and the tooth once again drops into the notch the contact between the arms, as described above, is broken and therefore terminal 18 (NG) is no longer connected to ground G1. A voltage, which is applied to the terminal 17 of Fig. 28, feeds current through the line $C_n$ to the polar head for magnetic cancellation.

If ring $S_a$ carries a magnetic recording, in turning it will induce current in the pole coil of the reading head $L_n$ (Fig. 13) and such current will arrive at terminal 16. Usually such induced currents are weak and require amplification for use. Recorded signals are usually of the form, shown in Fig. 7, of the signals transmitted by the teleprinter and require a special type of amplifier called a "direct current amplifier." In the embodiment of the present invention, however, as the performance of the reading head diminishes when the magnetism has slow variations, signals (Fig. 15b) are used to modulate an oscillator MO which will have a sufficient frequency, 2000 cycles per second, for instance. The oscillator gives signals of the type shown in Fig. 15a and the resulting signals are shown at Fig. 15c. These signals are transmitted to the terminal 15 (Fig. 28) and feed the line $I_n$ of the recording head and are the type recorded on ring $S_a$. The currents induced by these signals in the reading coil connected to the line $L_n$ are therefore similar to 15c although much weaker, and can be amplified by ordinary amplifiers instead of by direct-current amplifiers. The signals must then be rectified and passed through a filter which will remove the carier frequency, the resulting signals being shown at Fig. 15e.

These signals are similar to those of Fig. 15b, of the modulation operated by the electric signals transmitted by the teleprinter transmitter.

The modulated oscillator, which will be indicated as MO, may be carried out according to the usual and conventional scheme of Fig. 16a; the oscillations take place by means of the reactive coupling between the grid circuit of the triode and the oscillating circuit of the plate.

The current pulses are transmitted by the teleprinter transmitter to the terminal 23 and cause a difference of potential, which varies through the inductance $L_g$ (Fig. 16a).

This difference of potential, operating on the grid, modulates the amplitude of oscillations. The oscillations will then have the shape shown in Fig. 15c.

The MO signals receive a constant difference of potential, which is applied to the terminal $B_b$, before leaving the terminal 15 (Fig. 16a) and reaching the magnetic recording head. The aforesaid constant difference of potential furnishes the so-called direct current bias, and improves the recording and reduces the noise in the reproduction as practical experience shows.

Afterwards this circuit shown in Fig. 16a will be indicated with the block diagram of Fig. 16b.

The amplifier, rectifier and filter combination, which is indicated as AM, is shown in Fig. 17a.

T1 and T2 are two amplifying stages of the coupled type with resistance-capacity; T3 is a rectifier which operates by means of the curvature of the characteristic of the grid current. The condensers $c1$ and $c2$ and the inductance L2 form a pass-bass filter.

The currents of the reading head reach the terminal 16 and are applied to the grid of T1 by means of the transformer N, so as to match the impedances.

The output of AM is at terminal 22.

The AM circuits are shown with the block diagram in Fig. 17b.

The insertion of AM and MO in the electric circuits of the analytic machine will be illustrated later with reference to Figs. 29 and 30.

In the embodiment of the present invention the use of a system of three polar heads for each number has been indicated for the magnetic recording. But so as to have economical manufacture, a single system of three polar heads can be used for the recording of several numbers, by means of the device shown in Figs. 17c and 17d. These figures will be illustrated in the appendix at the end of the specification, as it is not considered necessary at the present to understand the working of the analytic machine.

SWITCHING MACHINE

The numbers storage rings (such as $S_a$ described in the preceding paragraph) are as many as there are numbers to be stored. For example, the storage magazine may contain one thousand rings, each ring, as explained above, terminating in the five electrical terminals 15—16—17—18—19 (Fig. 28). A selecting device is now required to select the desired ring.

For the purposes of the present invention, ordinary machine switching systems may be employed with the addition of certain accessories to render the dialling operations automatic. In the case of a thousand ring magazine, a preselector may be used with ten connectors, the preselector having ten positions with each of which a connector is associated, and each connector having 100 positions arranged in vertical and horizontal rows.

Only one selector (S1) is shown in Fig. 29 for brevity and the circuits of the switching machine SM are shown schematically because standard circuits and panels may be employed. For the purposes of the present invention it is sufficient to state that the rotation of the selector S1 connects the terminals 15—16—17—18—19 of each ring to the selector lines ending at terminals $I_s$, $L_s$, $C_s$, $N_s$ and SG. This SG ground connection has already been referred to in the description of Fig. 28. It should be noted that electromagnet $na$ (Fig. 28) is of the slow-energizing type so that it will not cause the ring to turn while the selector is turning into its selected position, but will only energize when the selector comes to rest in the desired position. Rotation of the selector contact arms is effected by any of the ordinary selector operating means. In Fig. 29, for instance, the selector is operated by current impulses sent by the dialling mechanism DI to the electromagnet SR which moves the toothed ring W forward one tooth for every impulse. Toothed ring W carries the selector contact arms which thus select the required storage rings $S_a$, $S_b$, $S_c$, etc., with the number corresponding to the index number dialled by DI. If terminal $R_s$ (Fig. 29) is grounded, the ordinary return electromagnet RM energizes and pulls off the stop catch on toothed wheel W which then returns to its initial position of rest either by means of a return spring or by the force of gravity, depending on whichever system is preferred.

The dialling system DI (Fig. 29) is an ordinary dial containing pulse contacts and a mechanism for governing the action of the contacts. The dial plate carries ten digits from 0 to 9 inclusive, on its face. In the embodiment of the present invention the dial is not operated manually but automatically by the following means. A gear wheel $r$ is fastened rigidly to plate $d$ and is rotated by a toothed sector $k$ which moves when the electromagnet DR is energized. This electromagnet DR receives its current from a group of lines which are connected to the multiple jack $SE_a$; the lines feed a group of associated relays contained in RT (see Fig. 18). The gear wheel $r$ carries an arm $h$ which, in turning, opens contacts $t1$, $t2$, $t3$, etc. one after the other, each of these contacts corresponding to one of the digits on the dial plate.

When one of the contacts C1, C2, C3, etc. is closed, ground $Gt$ is connected to the electric lines which terminate in the multiple jack $SE_a$ and which in turn go to the corresponding relays R1, R2, R3, etc. As an example, when contact C2 is closed for a brief instant, relay R2 energizes and closes contacts $k2$ and $h2$. $h2$ energizes electromagnet DR which turns sector $k$ thus turning gear wheel $r$, plate $d$ and arm $h$ which are all fastened together. The closing of $k2$ connects one end of the winding of R2 to ground $Gd$, the circuit being the following: $g2$, contact $k2$, contact $t2$, ground $Gd$. Thus relay R2 will remain energized even if point $g2$ is no longer connected to ground $Gt$. It will thus be seen that switch C2 need only be closed for an instant to start the dial mechanism turning and can immediately be released without stopping subsequent operation of the dial.

When the dial begins turning, arm $h$ opens the above-mentioned contacts $t1$, $t2$, $t3$, etc., one after the other. In the present example, when arm $h$ reaches contact $t2$ and opens it, it breaks the connection between $g2$ and ground $Gd$ thus de-energizing relay R2 and also electromagnet DR. The dial plate, which has now reached the correct position corresponding to the number 2, will then turn backwards sending the required current pulses to the selector, until it reaches its original position of rest. This return movement of the dial is effected by a dial mechanism motor spring which also includes a high-speed centrifugal governor which keeps the speed of return within the correct limits for proper impulse sending. The same operation takes place when any of the other contacts, $c1 \ldots c9$, $c0$, are closed. These contacts correspond respectively to the digits 1. . . 9, 0; the device for closing these contacts will be described later.

ELECTRIC CALCULATING MACHINE AND ACCESSORIES TO RENDER IT AUTOMATIC

*Inscription device (IM) of the electric calculating machine (ECM)*

Any ordinary calculating machine, which will here be called ECM, may be used in the embodiment of the present invention. For greater simplicity use may be made of the type having a "reduced keyboard," such as shown in Fig. 19, having ten keys for the digits 0, 1, 2, 3 . . . 9, used to write the numbers to be added or subtracted, and ten other keys to write the numbers of the multiplier, as well as accessory keys which govern the operations +, —, ÷, and others. In the present invention the calculator keys are not operated manually but electro-mechanically, as shown in Fig. 20. When current is sent to electromagnets $m1$, $m2$, etc., they operate the plungers $a1$, $a2$, etc., through any mechanical means, such as that illustrated in Fig. 20 where the electromagnet armatures pull flexible lines $f1$, $f2$, $f3$, etc.

guided by pulley wheels $g1$, $g2$, etc. and $p1$, $p2$, etc. The plungers $a1$, $a2$, etc., press down the corresponding keys of the reduced keyboard of the ECM.

In following description the keyboard shown in Fig. 20 for the electric operation of the inscribing process will be indicated schematically as in Fig. 21a; this figure shows only a part of the keys and associated electromagnets. These electromagnets are shown with their windings connected on one side to the battery B5 and on the other to electric lines; the energizing of each electromagnet is obtained by grounding the associated line. The grounding of a line is obtained by closing the associated contact, one of the contacts 1, 2, 3 etc. as shown in Fig. 21b (on the left of Fig. 21a).

These contacts are controlled by a teleprinter receiver MRP, which is the type of receiver which prints a message by the use of type-bars just like those in typewriters. There are as many type bars as there are letters and numbers, and one of these type-bars is shown at $h$ in Fig. 27a. They are operated by push-bars. In the case of the present invention the function of writing messages is considered merely an auxiliary operation, whereas another fundamental function is assigned to the type bars, that of closing contacts as shown in Fig. 27b. Each of these contacts, CA, CB, CC, etc. closes, when the associated type-bar A, B, C, etc. hits it, for a brief period, the length of which may be regulated, the elasticity of the contact springs allowing this regulation to take place, as shown in Figs. 27c, 27d.

In practice it is convenient to close the contacts by other bars, which are parts of the kinematic mechanism for the operation of the associated type-bars as shown in Fig. 27e; the contact $c$ is closed by the bar $k$, which operates the type-bar $h$, which operates the type-bar $h$, as in typewriter machines. These devices are found also in a teleprinter receiver, which as known (Fig. 27e) contains also the selector-bars $b1$ to $b5$, the pull-bar $P_b$, the operating solenoid SO, which causes the rotation of the shaft Q, carrying the operating bail BO, which moves in an arc toward the front of the printer, and the upper edge of the bail engages a notch on the lower edge of the depressed pull bar and drags it forwards.

The electric lines of Figs. 21a and 21b, and which are also shown in Fig. 21c, are indicated in the successive figures for brevity as in Fig. 21d, which recalls the stripping and fanning out of cables in a telephone-exchange office, where the terminals of the jacks, relays, etc. are necessarily close together. Fig. 21e shows a multiple commutator for connecting lines 1, 2, 3 etc. respectively to lines 1a, 2a, 3a etc. or to lines 1b, 2b, 3b, etc.; this commutator will be indicated for brevity as in Fig. 21f.

Fig. 21g is a sectional view of the commutator; the buttons such as P are operated together by the armature of a relay.

The inscription device $I_m$ of the ECM is represented in Fig. 21h, which shows the keyboard of ECM operated electrically by the type-bars of MRP, according to the preceding explanations for Figs. 19, 20, 21a, b, c, d, e, f, and Figs. 27a, b, c, d, e.

In Fig. 21h the lines are gathered in groups, group $k1$ serving for the inscription of digits to be added or subtracted, group $k2$ for multiplication, and group $k3$ for connecting the ground to the electromagnets associated with such operations as $+$, $-$, $\div$ and others.

The purpose of the commutators and of the contacts associated to the other type-bars I, S, P, etc. will be explained later with reference to Fig. 30.

The type-bars of the teleprinter receiver BRP of Fig. 8a also close electric contacts.

In this case of the present invention, complete keyboard calculating machines may be used which, in addition to the keys governing the operation of $+$, $-$, $\div$ etc., also have keys arranged in parallel rows, one row for the cipher "1," one for the cipher "2," etc., up to and including ciphers 9 and 0. Such use will be described in the additional specifications at the end of this description.

*Reading device $L_m$ of the ECM*

In the general diagram Fig. No. 1, and also in Fig. 2, it was indicated that the ordinary electric calculating machine ECM is also provided with a device $L_m$ to read the numerical results supplied by ECM. In the present invention this is achieved in the following manner: In general, the results of the calculations effected by ECM appear in the form of figures printed or engraved on the circumference of drums which are attached to the various toothed wheels forming the totalizing mechanism of the calculating machine. A first object of the reading device $L_m$ is to substitute teleprinter code signals for the figures on the drums. Fig. 22a shows one of these drums $f1$, the other drums, not shown, being mounted coaxially with $f1$ on the same shaft $pz$. In the embodiment of the present invention the toothed wheel $z1$ of device $L_m$ meshes with a second toothed wheel $z2$ (Fig.22b) which has a diameter sufficient to ensure enough clearance for drum $f2$ attached to toothed wheel $z3$ which meshes with $z2$. The wheels $z1$ and $z3$ have the same number of teeth with the result that drums $f1$ and $f2$ will have the same angular rotation. From the above it will be seen that drum $f2$ may be made to any diameter required, clearance being assured by merely increasing the diameter of the intermediate wheel $z2$.

Drum $f2$ carries teleprinter code ciphers in the same relative positions on its circumference as the numbers on drum $f1$. These code ciphers (Fig. 22c) are in the form of holes on the edge of the drum. Fig. 22c also shows the selector pins P and toothed wheel W of Figs. 5 and 6. The ciphers (Fig. 22b) are read through windows $g$, $l$, $j$ . . . in the cover H of the ECM. Fig. 23 shows this cover H and the ciphers on the various drums. The cover plate itself is curved between the windows to the same diameter as the drums with whose surface it is flush in order to facilitate movement of the exploring device from one drum to another. Code letters N and E, whose object will be specified in the section describing operation of the analytic machine, are printed on cover H before the first window and after the last window respectively. The third line of every series of holes which appear in each window, together with corresponding holes in the cover plate H between one window and another, form a continuous line of holes which, as in the case of the tape of Fig. 4, serve for advancement with the difference that in Fig. 4 the tape advanced and the exploring device was stationary, whereas in the present device $L_m$, the drums remain stationary during advancement of the exploring device, as in Fig. 24.

The little carriage $y1$ shown in Fig. 24 carries some parts taken from a teleprinter transmitter which we will call here MTP and which will be associated with the reading device $L_m$ of the electric calculating machine ECM. It must be remembered that the other teleprinter transmitter, associated with the punched tape PT was indicated with the letters BTP. The carriage $y1$ carries those parts of MTP already shown in Figs. 5 and 6, such as selector pins P, toothed wheel W, levers, the spring contacts operated by the selector pins, the corresponding electric lines $l_1$, $l_2$, $l_3$, $l_4$, $l_5$, the electromagnet $m$ and its corresponding lines $l_6$ and $l_7$. The other parts of the teleprinter transmitter MTP are contained in the set itself, such as the segmented ring with its brushes and motor and all parts which are not of direct interest to the advancement of the carriage and the movement and contacts of the selector pins, with the object of rendering the carriage $y1$ as light as possible.

As will be seen in Fig. 24, the advancement holes in the original paper tape PT are here replaced by the line of holes across the drums which appear in the windows and the corresponding holes in the sections of the face plate H between the windows. In addition the drums carry other teleprinter code holes which appear in the windows while there are holes at the extreme ends of the face plate for the letters N and E. It is as if the paper tape were stationary while carriage y1 advances across it.

The toothed wheel W is the member which engages with the continuous line of holes and advances the carriage y1 when an electromagnet m1 (Fig. 24) similar to m (Fig. 6), is energized. The carriage y1 moves along guides L1 and L2 supported by platform G1.

Carriage y1 is started forward by the closing of a contact 40 which at the same time opens contact 41 (Fig. 25). The parts which govern the closing of this contact 40 will be described in the section regarding operation of the analytic machine. By closing 40, one end of electromagnet m1 is connected through line $l_6$ to ground $G_p$ and thus m1 can energize and move carriage y1. The functions of contact 40 are similar to those of contact $T_s$ in Fig. 6 which keeps the magnet energized during operation.

When the carriage has completed its exploratory run, button g which it carries (Fig. 24) closes contact F1 which, as will be shown in the section devoted to operation of the analytic machine, causes opening of contact 40 and therefore closing of 41 which is thus connected to ground $G_p$. The electromagnet m1, lacking a ground connection, therefore de-energizes and the carriage stops. In addition, grounding point 41 (Fig. 25) causes closing of contact 42 (as in the analogous case of Fig. 26a) and therefore relay RY energizes and attracts its armature ya (Fig. 24) thus rotating platform G1 around its shaft qq. The teeth on wheel W come out from the drums and the carriage y1 is free to return to its initial position to which it is returned by spiral spring r which was loaded by the carriage itself during its advancement by means of wire f. The speed of return is kept uniform by a centrifugal governor c which operates by friction. The carriage will come to a stop when it hits the stop k1 and at the same time the button gr which it carries closes contact U1 which connects line lu to earth. As will be shown, closing contact U1 opens contact 42 and therefore RY de-energizes and platform G1 returns to its normal position, the teeth on W engage the holes, and the carriage is ready for another run.

It will now be shown how the grounding of contacts 41 or U1, even for an instant, can close or open contact 42, by the use of a group of two relays which are referred to in Fig. 25 by the dotted square indicated as CR1. This indication will also be a reminder that these relays form part of the group of connecting relays indicated, in the general view Fig. 1, as CR.

The operation of group CR1 will be shown in reference to a typical circuit, that of Fig. 26a, which is also applicable to other parts of the whole machine as described in the section devoted to operation of the analytic machine.

For operation of the analytic machine, it is necessary to make certain changes in the various connections, as shown for example in Fig. 26b, where a line l must be connected either to a line 1A or 1B. These connections are effected automatically by the two relays RA and RB of Fig. 26a when grounded through contacts CA or CB. In normal condition line l is connected to line 1A by the closed contact s1. If, at any time, it is required to connect line l to line 1B, this can be done by closing contact CB which connects relay RB to ground G1. RB thus energizes and closes contact s2 connecting l to 1B as required. At the same time contact s3 closes so that RB is also connected to ground G2 and thus remains energized even though CB is opened an instant later breaking contact with ground G1. In order to return everything to the original conditions, contact CA can be closed, even for a brief instant, relay RA is thus connected to ground G1 and opens contact s4 thus breaking contact with ground G2. As a consequence, RB de- energizes and thus closes contact s1, connecting line l to line 1A as required.

For simplicity, the circuits shown in Fig. 26a will be represented as shown in Fig. 26b, and this must be remembered when these circuits are applied in later figures.

The letters "A" and "B" contained in the lower and upper circles of Fig. 26b will be a remainder that grounding contact B will put the switch in its operating position, whereas closing A will return the switch to its normal position or will leave it there if it is already in that position. It must also be remembered that the armature can operate the contacts associated with a number of lines as, for example, those of groups K1, K2, K3 in Fig. 21h. This particular case will be indicated as in Fig. 26c, by shaded lines; this figure is similar to Fig. 21f, except that it has the two circles containing the letters, which indicate the contacts by which the commutator is operated.

OPERATION

In order to describe operation of the analytic machine, reference will be made to Figs. 28, 29 and 30. Fig. 28 has already been described in the section devoted to the numbers storage magazine and Fig. 29 in the section devoted to the switching machine. Fig. 30 uses the indicative diagrams of Figs. 8a, 16b, 17b, 21d, f, h, 26b, c grouped together.

Let us suppose that the values of the initial numerical data have been recorded in the numbers storage magazine NS on a certain number of steel rings in the manner described subsequently. For greater simplicity in the description we shall give an actual example. One steel ring, $S_a$ corresponding to the index number 358, will be recorded with the value 1702099.

Another steel ring, $S_b$, with the index number 241, is recorded with the value 243157. The operation to be effected is the division of the value $S_a$ by the value $S_b$ and the recording of the result on a third steel ring $S_c$ having an index number 187.

The paper control tape is first punched and the perforations are indicated by letters in Fig. 31 instead of in code signals for simplicity. The subsequent operations of the analytic machine, which take place automatically will be hereafter described in periods of time each of which is numbered.

*No. 1.*—The first letter "R" is transmitted by the teleprinter transmitter BTP (Fig. 8a) the code pulse currents leaving terminal 12 (of BTP) and 12A (Fig. 30), which are connected together and thus, through contact 35, reach terminal 38 of MRP, the teleprinter receiver associated with calculating machine ECM. Type-bar R of MRP establishes the "R ground contact" and contacts 32 close (see description of Fig. 26c) if they had remained open, and contacts 33 closed, as a result of preceding operations.

*No. 2.*—The letter "S" is now transmitted by BTP and type-bar "S" of MRP establishes the "S ground contact," contacts 29 close and thus the electric lines of row H1 of MRP (see Figs. 21d, f, and 26c) are connected to the corresponding lines that terminate at 25 in the multiple pins plug $SE_b$, which is inserted in the multiple jack $SE_a$, and thus are connected to the points indicated by g1, g2, etc. in Fig. 18, and which feed relays R1, R2, etc. of RT (see also Fig. 29).

*No. 3.*—The digits 3, 5, 8, of the index number of $S_a$ are now transmitted one after the other by BTP and the type bars 3, 5, 8, of MRP make successive contacts with the 3, 5 and 8 grounds connecting them successively with the lines of row H1 of MRP corresponding to those grounds. These lines, through terminals 25 and the action of the relays enclosed in RT, which were described with reference to Fig. 18, operate electromagnet DR and thus the digits 3, 5 and 8 are dialled one after the other. The arms on S1 rotate and reach the position corresponding to steel ring $S_a$. The selector ground SG is connected to the magnetic clutch *na* as described with reference to Fig. 28, and ring $S_a$ begins to turn. Ground NG as was illustrated for Fig. 28, is now connected to terminal 18 and thus to terminal 20, energizing electromagnet GR which closes contact 36 and opens contact 34, thus breaking contact between ground $G_m$ and terminal 11A, which is connected to the terminal 11 of Fig. 8a, de-energizing *m* (Fig. 8a) with the result that the punched tape PT comes to a stop. The steel ring $S_a$ has been previously magnetized with the recording "N9902071E" consisting of the letter "N," the digits of the $S_a$ value in inverse order (first units, then tens, then hundreds, etc.) and the letter "E". As ring $S_a$ turns, the induced currents corresponding to the recording on $S_a$ follow line $L_n$ to terminal 16 of the selector S1, are amplified, rectified, filtered at $A_m$, travel to terminal 22 and, finding contact 36 closed as stated above, reach terminal 38, operating the type-bars of MRP successively in correspondence with the recording on $S_a$. The letter "N," the recording of which will be explained subsequently, precedes the ciphers of the value of $S_a$, so that type-bar N of MRP will establish the "N ground" and contacts 28 are closed. The lines which establish the grounds of MRP corresponding to the digits 9—9—0—2—7—1 (the value of $S_a$ beginning, as stated above, with units, then tens, then hundreds, etc.) are successively connected by means of the multiple contacts 28 and 32 to the corresponding lines of the inscription device $I_m$ of the calculating machine ECM, and thus the keys of row $K_1$ of ECM are pressed in the order transmitted by the steel ring $S_a$ and thus the value of $S_a$ is set up in calculator ECM ready to be introduced in the totalizer $T_1$ (depending on the type of ECM used). This operation will take place when the control tape BTP subsequently transmits the sign +. The ciphers of the value of $S_a$ are followed by the letter "E" on the steel ring and subsequently it will be shown how this is obtained. This letter "E" causes operation of the type-bar E of MRP which, as will be seen in the block diagram of MRP in Fig. 30, grounds terminal 24 and line RS, which feeds the return magnet RM of S1 thus returning selector S1 to its original position, which in turn breaks the ground contact between terminal 18 and line $N_s$ connected with terminal 20, and thus GR is de-energized and contact 35 closes again, as does contact 34 which connects ground $G_m$ to terminal 11A (which is connected to 11 on the BTP), and as a consequence BTP again starts "reading" the punched tape. Steel ring $S_a$ completes one turn, as explained in describing Fig. 28.

*No. 4.*—The sign "+" is transmitted by BTP, this current pulse following a circuit through points 12 (of Fig. 8a), 12A, 35, 38, and the type-bar "+" of MRP gives the "+" ground and the "+" key of ECM is operated. The values of $S_a$ are therefore transmitted to the totalizer in ECM (see period No. 3).

*No. 5.*—Having seen how the value of $S_a$ is selected from its steel ring, transmitted to the ECM and then set up on the totalizer, it will now be shown how the value of $S_b$ is set up. The transmission of letter "R" is no longer necessary because contact 32 was closed in period No. 1 above. The letter Q is used to effect the operation of multiplication, see illustration of Fig. 21h. Therefore letter "S" is now transmitted, as in period No. 2.

*No. 6.*—Digits 2, 4, 1, of the index number of $S_b$ are now transmitted one after the other. As will be recalled, the value of $S_b$ was 243,157. The steel ring $S_b$ is supposed to have been previously prepared with the recording "N751342E" (the value of $S_b$ in inverse order, preceded by N and followed by E). The circuits which now operate to set up the value of $S_b$ on the totalizer of ECM are exactly the same as those used for $S_a$ in period No. 3.

*No. 7.*—The division sign ÷ in code is now transmitted by BTP and operation is the same as in period No. 4 above. When the ÷ order reaches ECM, the calculating machine operates and makes the division. We will assume that the machine ECM is the type in which the result of the division, which is the cipher "3," appears on the totalizer T2.

*No. 8.*—A code signal corresponding to the letter "I" is now transmitted by BTP and the type-bar I of MRP is operated, establishing the "I ground" so that contacts 26 and 27 close and battery B7 (which gives cancelling current) is connected to terminal 21 and line $C_s$ (of the cancelling head of the steel ring), while through the closing of contact 27 the output lines from the teleprinter transmitter MTP of the ECM is connected to terminal 23 and line $I_s$ (the steel ring inscription line). The motor of MTP, receiving battery B8 from contact 39, will also start.

*No. 9.*—BTP transmits the code pulses corresponding to the letter "Z," thus MRP closes multiple contact 31 and the lines (I1 to I6 of Fig. 24) of selector pins P2 and magnet *m2* associated with totalizer T2 are connected to the input $I_t$ of MTP (Fig. 30) of associated MTP. Electromagnet *m2* (which causes advancement of P2) is connected to MTP and is thus ready to start as soon as ground GP is established by the closing of contact 40, as described with reference to Figs. 24 and 25.

*No. 10.*—BTP now transmits the code pulses for the letter "S" and the subsequent operations are the same as described in period No. 2.

*No. 11.*—The index number 187 of $S_c$ (the result of the division in ECM which is to be recorded on steel ring $S_c$) is now transmitted by BTP and, as in the case of period No. 3 above, steel ring $S_c$ of the storage magazine is now dialled by the dialling device and its lines are connected to lines $N_s$, $C_s$, $L_s$, $I_s$ of selector S1. Steel ring $S_c$ starts turning and ground NG (see description of Fig. 28) is connected to relay GR which energizes. Contact 34 opens, the punched tape stops, contact 40 closes as described in period No. 9, electromagnet *m2* can now energize (see description of Figs. 24 and 25) and carriage *y2* which carries the selector pins P2 receives its advancement movement. MTP transmits the current pulses corresponding to the digits appearing on the totalizer T2 (the results of the division in ECM) to contact 27, point 23, line $I_s$, oscillator $M_o$, line $I_n$, and the winding on the recording head of steel ring $S_c$. It should be noted that the three couples of poles (see Fig. 28) come in the following order: $C_n$, $L_n$, $I_n$, so that cancelling precedes the others and since there are therefore no signals in the steel ring when it reaches the reading head, no current will appear at terminal 22 and contact 36 and thus MRP will not be operated. The code signals appearing on face plate H (Fig. 24) of the ECM are the letter N followed by the digits of the totalizer T2 and then the letter E, as explained previously for the signals recorded in rings $S_a$ and $S_b$ and for the description of the cover H of Fig. 23.

When the "reading" carriage *y2* reaches the position in which its selector pins explore the final code signal (the letter E) on the faceplate, then contact F2 is closed (see also Figs. 24 and 25) and its ground is connected to terminal 24, line RS, return magnet RM (of the selector S1), while ground SG is removed from terminal 19, ground is also removed from line NG, and from line $N_s$, relay GR de-energizes, contact 40 opens, ground GP is removed from *m2* and carriage *y2* stops. The opening of contact 40 and closing of 41 causes the return of carriage *y2* to its initial position as explained for Figs. 24 and 25. It has been shown, in the above, how contacts 40 and 41 are closed and opened, as was stated during the description of Figs. 24 and 25. Steel ring $S_c$ now completes one turn and comes to a stop.

The general operation of the analytic machine, as described in the heading of this chapter, has thus been described.

The initial data (the values to be used in the calculations) were recorded on steel rings $S_a$ and $S_b$ at any period previous to the above operations by similar means using teleprinter code signals punched on paper tape (as in Fig. 32). Letter "R" refers to row $k1$ of the ECM as explained in period No. 1, the digits 9902071 in Fig. 32 are the value of $S_a$ in reverse order; these digits are transmitted by MRP to row $k1$ of keys on ECM and the sign ÷ causes the digits to be set up in the totalizer T1 of ECM as explained in period No. 4. The succeeding letters IWS and digits 3, 5, 8 (Fig. 32) act as explained in periods 8, 9, 10, 11 and the letter W refers to contacts 30 and selector pins P1 associated with totalizer T1; the digits 3, 5, 8 refer to the index number of $S_a$.

A similar procedure is employed in recording the value of $S_b$ on steel ring $S_b$.

The values of $S_a$ and $S_b$ are thus recorded on their appropriate steel ring in the numbers storage magazine and are ready to be used in the calculations described above.

Additional specifications

The punched tape and associated teleprinter units BTP and BRP (Fig. 8a) can be used to operate a number of ECM calculating machines and their accessories $I_m$, and $L_m$, with their associated MRP and MTP, instead of merely one machine as described above. The operation of a single ECM and its accessories was obtained, it will be recalled (Fig. 30) by connecting terminals 11 and 12 of BTP to terminals 11A and 12A of ECM and accessories.

If there are a number of groups (A, B, C . . . X) of ECM (Fig. 30) to be operated, it will be sufficient to connect terminals 11 and 12 to 11A and 12A for group A, to 11B and 12B for group B or 11C and 12C for group C and so on, depending on which particular group is required. Such connections can be obtained as shown in Fig. 33. If a particular group (A for instance) is required, then BTP transmits the corresponding letter "A" which is "read" by BRP. BRP is equipped just like MRP (its type bars establishing ground contacts as in Fig. 27b). The "A ground" of type bar A thus closes (remember Fig. 26b) contacts 2 and 3 (Fig. 33) and thus selects group ECM which carries letter "A" for identification. When group A is to be excluded, then letter "V" is transmitted, this opening contacts 2 and 3 so that another group may be selected.

It was shown in the preceding section that the punched tape came to a stop when ground $G_m$ (Fig. 30) was removed from terminal 11A as a result of the opening of contact 34 when relay GR energizes. This action takes place when a steel ring has made one complete turn, either in recording (such as $S_c$ above) or in reading (such as $S_a$ and $S_b$ above) or when ECM is engaged in calculating, in which case the switch OPE (Fig. 30) of ECM is closed and relay GR is energized, since it receives the ground from contact OPE.

During the above operations it might be useful to utilize the punched tape to operate other machines instead of keeping it stationary. In this case immediately after BTP has transmitted the last cipher for the selection of a steel ring in the numbers storage magazine, or immediately after it has transmitted the calculation starting signal to ECM, it will then transmit the letter "V" which was also perforated in the correct position on the punched tape PT. Contact 1 (Fig. 33) thus closes and ground GK is connected to terminal 11 and the punched tape may now control other machines instead of standing idle, since the relay GR (Fig. 30) is of the slow-acting type.

Let us suppose that BTP again wishes to operate the A group of ECM. It will transmit the letter A and contacts 2 and 3 (Fig. 33) will close, while contact 1 will open. Now, if group A has completed the operation in which it was engaged, then terminal 11A (Fig. 33) will be connected to ground. If, on the other hand, group A has not terminated its previous operation, then terminal 11A will not be connected to ground and since no ground connection is reaching terminal 11, the punched tape will stop and will wait until group A has terminated its previous operations and is ready to start another operation, when it will start again on receiving ground from group A.

The circuits shown in Fig. 33 are easily applicable when the number of ECM calculating machines is small. If, instead, there should be a large number of ECM groups to be operated at the same time, it would be better to employ several punched tapes and associated MRP and BRP (as was indicated in the diagrammatic view Fig. 2 where two signal transmission units, D1 and D2 are shown) or else means may be used to defer action of the control signals of the punched tape, as was indicated when specifying the objects of the present invention (object No. 9). This result may be obtained by attaching an auxiliary device to every ECM for recording magnetically on a steel wire (indicated as SWR in Fig. 34). Terminals 11 and 12 in Fig. 34 are the points indicated by 11 and 12 in Figs. 8 and 33, and in other words are the terminals of BTP, the teleprinter transmitter associated with the punched tape. Terminals 11A and 12A in Fig. 34 are the same points 11A and 12A shown in Fig. 30 in reference to the ECM and accessories. In other words device SWR of Fig. 34 is inserted between the punched tape BTP on one side and the ECM group identified as A on the other. The same thing may be done with other SWR devices regarding other ECM groups such as B, C, etc.

SWR operates in the following manner:

When BTP transmits the letter "A," this is "read" by BRP (Fig. 8a) and its type-bar A establishes the "A ground" and contacts 51, 52, 53, 54 (Fig. 34) will close (see Fig. 26b). Contacts 53 and 52 place device SWR under the control of BTP. Contact 54 closes the circuit between relay CR and ground; the circuit is: ground GW, contact 59, contact 54, point 55, winding of CR, battery B10, ground. Relay CR thus energizes and by closing contacts 60 and 61 allows motor WM to receive current and start. This motor, through device IM which will be described below, operates pulley wheel $p2$ which moves steel wire SW on which the recording is to be made.

The recording currents arrive from BTP along the following path: terminal 12, contact 53, contact 57, modulated oscillator MOW, recording head $I_w$. The punched tape can obtain advancement because terminal 11 is connected to ground through contacts 52, 54, 59 and ground GW.

When BTP has finished transmitting its instructions regarding machine A with which device SWR is associated, then it will transmit letter "T" perforated in advance on the punched tape. This signal "T" is "read" by BRP (Fig. 8a), type-bar T of BRP is depressed and establishes "T ground" contact meaning that the instructions to be recorded on wire SW have terminated. Contacts 51, 52, 53 and 54 open and BTP is now free to send instructions to other machines, B, C, D, etc. Opening of contact 51 removes the current from battery B11 to cancelling head CW which is used to cancel any previous instructions recorded on the steel wire SW in order to permit recording of the present instructions.

With the opening of contacts 59 and 54, ground GW is no longer connected to point 55, but relay GR will not de-energize because point 55 is also connected to contact 62 which closed when letter "T" was transmitted. Contact 62 is therefore connected to terminal 11A which, as shown in Fig. 30, is connected to ground $G_m$ as long as relay GR (Fig. 30) is not energized. Motor WM will therefore continue operating.

Transmission of the letter "T" also closes contact 63 so that relay RR energizes and sets device IM in operation. This device is illustrated in Fig. 35 and operates as follows: When RR energizes, its armature $a$ presses against shaft KW and overcoming the action of spring $rw$ causes the pulley wheel $p2$ which moves steel wire SW to press against wheel $a$ in a friction grip. Under normal conditions, however pulley $p2$ is held against wheel $b$ by the spring $rw$. Both wheels $a$ and $b$ are loose on shaft KW and, as illustrated in Fig. 36, receive their movement from motor WM, both turning contemporaneously but in opposite directions. In addition the wheel $a$, because of the intermediate toothed wheel $c$, will turn at a slower speed than wheel $b$. The result is that when RR is energized, it will cause steel wire SW to move in the opposite direction and at a slower speed. In other words signals may be recorded from BTP at a relatively fast speed and then wire SW will move at a slower speed and in the opposite direction when it transmits the recorded instructions to its associated ECM; the motors of BRP and of MRP are arranged to have adequate relative velocities.

Transmission of the letter "T," as was shown previously, closes contact 58 (Fig. 34) and the signals "read" by the reading head LW, after being amplified and rectified at AW (see Fig. 17$b$) go through contact 58 to point 12A where they will enter the associated ECM. It will thus be seen that device SWR will take the place of BTP in sending instructions to ECM. When the instructions were recorded on wire SW, the recording was terminated with the letter "V." When the instructions are transmitted to MRP (Fig. 30) of the ECM, type-bar "V" establishes "V ground," thus causing the opening of contacts 62 and 63 and thus relays RR and CR will de-energize, motor WM and wire SW will come to a stop and the reversing device IM will return to normal. Contacts 56 and 57 associated with the cancelling and recording heads CW and IW will also close. In other words the whole device SWR will return to normal, ready for other instructions from BTP.

It should also be noted that when wire SW operates in reverse during the "reading" of the recorded instructions, the code impulses are "read" in backward order and therefore, if it is required that device SWR transmit the letter "P" for instance to ECM, it is necessary that BTP send to SWR in the first place a letter whose impulses are the opposite in succession to those of letter "P." Such a letter, as shown in the fragment of the code alphabet in Fig. 4, would be the letter "F." The same thing must be done in connection with the other letters and figures. In addition, the whole succession of letters and ciphers must be recorded in inverse order.

Another specification, in the embodiment of the present invention, is the possibility of utilizing calculating machines having complete keyboards, instead of the reduced-keyboard type as described previously. This possibility was indicated during the description of the inscribing device $I_m$ of ECM.

In order to permit use of such "complete keyboard" calculating machines, the inscription device indicated in Fig. 20 may simply be mounted on a carriage $yc$ (Fig. 37). The inscription device includes magnets $m1$, $m2$, etc., corresponding pulleys $p$, $q$, wires $f$, push-bars $a$, etc. In Fig. 37 only the push bars $a0$, $a1$, have been indicated for brevity. The electromagnet RA seen in Fig. 37, when energized, moves toothed-wheel W ahead one tooth. This wheel W is rigidly connected to pulley N and when it turns, wire "$f$" is wound on N and thus advances carriage $yc$ so that push rods $a0$, $a1$, may act successively on the various rows of keys on the "complete keyboard." In Fig. 20 contacts C are indicated. These contacts are connected to ground when any of the magnets $m1$, $m2$, etc. are energized by the pressing of one of the keys on ECM. As shown in Fig. 37, the object of contacts C is to close contact 70 and therefore energize RA and advance the carriage $yc$ one step when one of the keys of ECM in one of the vertical rows of keys has operated.

When electromagnet RA energizes, its armature $ga$ establishes ground contact at H so that contact 70 will open and the armature $ga$ will return to its initial position.

In order to start the movement of carriage $yc$, and to return it to its original position at the end of its run, similar devices are employed to those described for carriage $y1$ in Figs. 24 and 30; by a return electromagnet, similar to RM of Fig. 29, a stop catch on wheel W is pulled off, and W returns to its initial position by means of a return spring.

Another additional specification refers to the device indicated in Figs. 17$c$ and 17$d$; so far, in the embodiment of the present invention, a system of three magnetic heads has been indicated for recording each number magnetically in the numbers storage magazine, as in Fig. 28, but, for the sake of economy, a single system of magnetic heads may be employed for recording several numbers, as shown in the device illustrated in Fig. 17$c$.

In this system, recordings on the steel ring are effected along concentric circles, each circle handling one number. The flat face of the ring should naturally be wide enough to accommodate the various concentric recordings. With this method, it would be better to employ magnetic heads as shown at I in Fig. 17$d$, instead of the polar couple system indicated in Fig. 13, the system suggested being known as the "ring head," exploring only one face of the disc. In this Fig. 17$d$, the coil which carries the current has been indicated by $h$, D is a section of part of the disc on which the numbers are recorded; the dotted lines indicate the magnetic flux at the moment of recording.

In Fig. 17$c$, it is shown that a polar head, for example I1, explores the circle corresponding to the desired number because it may be adjusted radially in order to correspond with the desired circle on disc D, since it is mounted at the extremity of the toothed rod K1, which is caused to advance the desired amount by toothed wheel R1 mounted rigidly on shaft H, this shaft being the shaft of a selector, one arm of which is indicated schematically by A.

For example, the various circles can be spaced concentrically at $\frac{1}{10}$ inch intervals, and a single disc may be used for recording ten different numbers with ease instead of merely one numerical value. As stated previously, an index number corresponds to each numerical value, this index number being composed of various digits, the first of which, for example, causes the selector arm to move when the index number is dialled as indicated in Fig. 29, thus bringing the head I1 into correspondence with the circle corresponding to that particular digit of the index number. For the following digits of the index number, instead, operation follows the method exactly as indicated for Figs. 28 and 29; it is for this reason that certain parts of Fig. 28 have been shown in Fig. 17$c$, such as fork $f$, spring contacts $r1$, $r2$, $r3$, the notch $e$, shaft $p$, etc. Fork $f$ in this figure has exactly the same function as in Fig. 28, in other words to transmit, by friction, the movement of shaft $p$ to disc D when magnet $na$ is energized and thus the polar heads explore a whole circle.

Although some systems employing a single polar head for reading, cancelling and recording are known, Fig. 17$c$ indicates the method for causing contemporaneous radial movement of reading head L with head I1 by means of toothed wheels R2 and R3 and toothed rod B2. The same can be done for the cancelling head.

COMPLETE CIRCUIT DIAGRAM OF THE ANALYTIC MACHINE

The electric circuits of the analytic calculating machine which have been shown schematically in Figs. 28, 29, 30 using symbolic diagrams, are shown, for greater clarity, in the more detailed Figures 38$a$, $b$ and $c$, in which all parts including the electric lines are numbered as in the other diagrams. It is understood that these three Figures 38$a$, $b$, $c$, connect together when placed side by side, the electric lines of $a$, for instance, continuing on to $b$, and from $b$ on to $c$. In substance, Fig. 38$a$ is a repetition of Figs. 28 and 29, and we therefore refer to the explanation given for said figures, merely adding details to clarify the correspondence between the various figures. Fig. 38a shows just three steel rings, $S_a$, $S_b$, $S_c$, of the numbers storage magazine NS, but it must be clearly understood that this numbers storage magazine can consist of many hundreds of these storage rings. A full description of a single ring and how it is operated by its magnetic clutch has been given in the description relative to Fig. 28, and to Fig. 14.

Fig. 38a also shows two selectors S1A, S1B, but it must be borne in mind that there will be a number of these selectors corresponding to the number of electric calculating machines (ECM) employed in the whole system. Selector S1A, for instance, operates in connection with the ECM labelled "A", S1B with the ECM labelled "B", etc. Operation of a selector has been described in detail in the explanation of the Switching Machine of Fig. 29.

As clearly shown in Fig. 38a, a lines multiplying system is provided to connect the electric lines from one steel ring to all the selectors, so that each ECM can be connected through its own selector to any steel ring. For example, lines 15—16—17—18—19 coming from steel ring $S_a$, are connected as shown in Fig. 38a to the transverse electric lines 15', 16', 17', 18', 19' which are also labelled "a". From these transverse lines, radial lines lead to the corresponding contacts on the contact banks which are explored by the selector arms of selectors S1A, S1B etc. This system of lines in multiple was indicated in the description of Fig. 2 under the subtitle General Description.

The path of lines $N_s$, $C_s$, $L_s$, $I_s$, $R_s$ leading from selector S1A will here be indicated, but exactly the same description applies to the lines leaving all the other selectors.

Distribution of the calculating operations to the various ECM's (ECM "A," ECM "B," ECM "C" etc.) takes place as described for Fig. 33 which, in substance, has been repeated in Fig. 38b, the only difference being that the contacts indicated by the numbers 1 to 9 in Fig. 33, have instead been indicated by the numbers 51 to 59 in Fig. 38b. Figures 30 and 33 indicate briefly the relay switches making use of the schematic diagram 26b, in which the relay circuits are merely indicated by two circles, one above and one below, containing the letters which indicate the contacts from whose grounding the operation of the switch depends. This Fig. 26b briefly indicates the system of circuits of Fig. 26a. Figs. 38b and c instead use the complete diagram of Fig. 26a, to the description of which reference is made. Thus, in Fig. 38b, we have the relay couples RA and R'V, RB and R"V, RC and R"'V to operate the switches that connect lines 11A and 12A, 11B and 12B, 11C and 12C in relation to the grounding of contacts A; B; C; V of set BRP which "reads" the transmission of BTP, as already described in relation to Fig. 33. Similarly, in Fig. 38b, we have the relay couples RE, RI, which also operate according to the diagram of Fig. 26a; these relays RE and RI close contacts 26, 27, 39 whose function has been described in relation to Fig. 30 in which, as was pointed out above, the numbering of the circuits is the same as that in Fig. 38b. Excitation of relays RE and RI is caused by the grounding of contacts E and I of the MRP; which takes place when MRP "reads" the letters E and I as described in relation to Fig. 30. Similarly in Fig. 38b, relays RN and $R_s$ switch the lines coming from contacts 1, 2, 3, 4 ... 9, 0, of MRP connecting them to the system of lines 28 or to the system 29, keeping in mind the fact that the contacts of MRP are grounded momentarily when MRP receives the transmission of the corresponding number. These line systems 28 and 29 are also indicated in Fig. 30, in which the Fig. 21f (schematically representing Fig. 21e) is employed.

Operation of relays RN and RS of Fig. 38b takes place with the grounding of contacts N, S, of MRP and the description relative to Fig. 30 explained when these contacts N, S are grounded.

In Fig. 38b it has been considered sufficient to indicate the multiple plug and multiple jack merely with the letters $SE_a$ and $SE_b$, as was done in Fig. 30, to indicate these parts which connect lines 25. These lines 25, as also indicated in Fig. 38b, enter device RT which was explained in the description relative to Fig. 18.

Lines $N_s$, $C_s$, $R_s$, which leave the arms of selector S1A, follow the same path both in Fig. 38b and Fig. 30, while the lines Ls and Is of Fig. 30 have been labelled L'$_s$ and L"$_s$, I'$_s$ and I"$_s$, for greater clarity at the entry and exit of devices AM and MO which, in Fig. 38b, have been repeated completely with the diagrams used in Figs. 16a and 17a, whereas in Fig. 30 the block diagrams as shown in Figs. 16b and 17b were used to indicate AM and MO. In Fig. 38b, the battery $B_b$ of device MO has the same function as described for terminal $+B_b$ in Fig. 16a.

In Fig. 38c, the system of ten lines labelled 28 can be connected to the system of lines labelled 32 or to the system labelled 33 by means of a group of switches operated by the couple of relays RR and RQ, operating as in Fig. 26a. These relays are operated by the grounding of contacts R and Q of MRP, when MRP receives the impulses corresponding to these letters.

In the same Fig. 38c, another group of switches operated by relays RZ and RW connect the entry of MTP to lines 30 or lines 31, that is, to the exploring devices of T1 or T2. Also in Fig. 38c, the system of relays RY1, RY2, RU1, RU2, R41–1 and R41–2, operate in the same manner as described for Figs. 25 and 26a, and cause the return of the exploring carriages Y1 and Y2 of the totalizers T1 and T2.

To sum up, Figs. 38a, b, c, merely show in greater detail what has been shown in Figs. 28, 29, 30. The operation of the analytic machine may be followed in Figs. 38a, b, c, following the description given for Figs. 28, 29, 30 in the chapter on "Operation," where an example has been given of the steps involved in the division between two numbers.

A similar procedure is employed in the case of sums, differences or products.

As regards operations of a more complicated series, an example will be given in the following chapter.

*Hypothetical problem and operation of analytic machine to solve it*

An example will now be given of the manner in which the analytic machine is employed to solve an algebraic equation having a single unknown quantity by the Newton method of successive approximations. This method falls in the class of mathematical methods called "iteration processes," which also include various methods for solving differential equations and differential equation systems with the special step-by-step and successive approximation systems. These methods may be found in the bibliography.

A fourth degree algebraic equation will be considered, but the method is equally applicable to equations of any degree.

Given the equation $$ax^4+bx^3+cx^2+dx+e=0$$

where $a$, $b$, $c$, $d$ and $e$ are given constant numbers and $x$ is the unknown quantity.

We will indicate with $y=F(x)$ the value which the first number of the equation assumes when $x$ is given a certain value. If X is the value of one of the roots of the equation, then $F(X)=0$.

From differential calculus we know that $$4ax^3+3bx^2+2cx+d$$

is the derivative of the function $F(x)$; we will indicate this derivative by $DF(x)$ or with "z," in other words, we will make $z=DF(x)=4ax^3+3bx^2+2cx+d$.

In substance, the mathematical method of Newton is the following.

$x$ is given an initial value of $x_0$, which is supposed to be approximate to the value X of the root. $F(x_0)$ is calculated, in other words:

$$y_0 = F(x_0) = ax_0^4 + bx_0^3 + cx_0^2 + dx_0 + e$$

and in addition the value of the derivative is calculated in correspondence to $x_0$, in other words:

$$z_0 = DF(x_0) = 4ax_0^3 + 3bx_0^2 + 2cx_0 + d$$

We will write:

$$x_0' = \frac{y_0}{z_0} = \frac{F(x_0)}{DF(x_0)}$$

We find, in differential analysis, that the value $x_1 = x_0 - x_0^1$ is usually more approximate to the root than $x_0$ is.

By repeating the process, we get successive values which approximate more and more to the root X. Thus, we calculate the following values:

$$y_1 = F(x_1) = ax_1^4 + bx_1^3 + cx_1^2 + dx_1 + e$$

$$z_1 = DF(x_1) = 4ax_1^3 + 3bx_1^2 + 2cx_1 + d$$

$$x_1^1 = y_1 \div z_1$$

Then, calculating for the value $$x_2 = x_1 - x_1' = x_1 - \frac{y_1}{z_1}$$

we get $x_2$ as still more approximate to the root X than $x_1$ was.

The general iteration formula to be employed for the $n$th approximation is:

$$x_n = x_{n-1} - x_{n-1}'$$

where $$x_{n-1}' = \frac{y_{n-1}}{z_{n-1}}$$

We will give a numerical example, taking the following values of the constants:

$$a=1;\ b=0;\ c=0;\ d=0;\ e=-16$$

In this case, therefore, the equation will read: $x^4 - 16 = 0$. This equation is equivalent to: $x^4 = 16$. In this simple case, the root of the equation is $$X = \sqrt[4]{16} = 2$$

Let us now see how the method of iteration leads to this value, $X=2$ by successive approximations. The formulas to be employed in this case are:

$$y_{n-1} = 4x_{n-1}^4 - 16$$

$$z_{n-1} = 4x_{n-1}^3$$

$$x'_{n-1} = \frac{y_{n-1}}{z_{n-1}} = \frac{x_{n-1}^4 - 16}{4x_{n-1}^3}$$

$$x_n = x_{n-1} - x'_{n-1}$$

We will assume the initial value $x_0 = 1$. By doing the calculations, we obtain the values given in the following table:

| | $x_{n-1}$ | $y_{n-1}$ | $z_{n-1}$ | $x'_{n-1}$ | $x_n$ |
|---|---|---|---|---|---|
| 1 | 1 | −15 | 4 | −3.75 | 4.75 |
| 2 | 4.75 | 493.066 | 428.68 | 1.15017 | 3.5998 |
| 3 | 3.5998 | 151.928 | 185.59 | 0.81420 | 2.7856 |
| 4 | 2.7856 | 44.212 | 86.46 | 0.51135 | 2.2742 |
| 5 | 2.2742 | 10.752 | 47.05 | 0.22852 | 2.0457 |
| 6 | 2.0457 | 1.5147 | 34.24 | 0.04423 | 2.001512 |
| 7 | 2.0015 | 0.0484 | 32.07 | 0.00151 | 2.000002 |

It should be noted that after the initial $x_0=1$, we obtain the value $x_1=4.75$ which, in fact, is farther from the root $X=2$ than the initial value $x_0=1$; but in the successive steps the value of X was approached rapidly, as can be seen from the last column of the table. This procedure, as stated above, can be extended to find values of any degree and to solve algebraic equations of any degree.

It will now be shown how the analytic calculating machine according to the present specification effects the various calculations in successive cycles.

For the present example we will suppose that only the ECM labelled "A" is used. The rapidity of the series of calculations can naturally be increased if the ECM's labelled B, C, etc. are also used.

In the present example, 11 steel rings of the numbers storage magazine NS will suffice, those carrying the index number 0, 1, 2 . . . 10 being used. They will be referred to more briefly as S0, S1, S2 . . . S9, S10. These steel rings are employed to store the recordings of the numerical values of the variables indicated in the following list:

| Ring | S0 | S1 | S2 | S3 | S4 | S5 | S6 | S7 | S8 | S9 | S10 |
|---|---|---|---|---|---|---|---|---|---|---|---|
| Variable | $n$ | $x_{n-1}$ | $x_{n-1}^2$ | $x_{n-1}^3$ | $x_{n-1}^4$ | 16 | 4 | $y_{n-1}$ | $z_{n-1}$ | $x_{n-1}^1$ | 1 |

A first phase consists in introducing the initial data into the steel rings and, to be exact, the value 1 as the initial value of $n$, in S0; 1 as the initial value of $x_{n-1} = x_{1-1} = x_0$ in S1; the constant values 16, 4, 1 respectively in steel rings S5, S6, S10. Introduction of these initial values takes place by the procedure described with reference to Fig. 32; the corresponding paper tape to be prepared is the following:

R1+IWS0  1+IWS1  61+IWS5  4+IWS6  1+IWS10

For the significance of symbols, reference may be made to the explanation concerning Fig. 32. The paper tape used for the initial data is of the "open" type. It should be noted, as explained for Fig. 32, that the numerical value 16 to be recorded on ring S5 is inscribed on the tape as 61, in other words first the units then the tens of the whole number. The inscriptions to be recorded on the paper tape in the form of code perforations are shown above in the form of normal alphabetical letters and numbers for the sake of clarity.

The inscriptions to be made on the paper tape of the closed type which follows and which is employed for the successive operations, are the following:

RS1  QS1  IWS2  RS2  QS1
                             IWS3  RS3  QS1  IWS4

RS4+S5−IWS7  RS3  QS6  IWS8  RS7+S8÷IZS9

S1+S9−IWS1  RS0+S10+IWS0

This type of perforation serves for every extraction of the fourth root, whatever the initial data introduced by the "open" type tape. In other words, the "closed" tape may be utilized every time it is desired to extract the fourth root with the method of successive approximations.

The various operations indicated by the letters on the "closed" tape will now be described. Reference may be made to the explanation already given in the chapter on "Operation of the Analytic Calculating Machine."

RS1  QS1  IWS2: R signifies employing row K1 of ECM, as indicated both in Fig. 30 and Fig. 38c; S1 serves to "call" the numerical value recorded on steel ring S1, in other words the value of $x_{n-1}$ corresponding to $n=1$, or $x_0 = x_{1-1} = 1$, as explained for the "open" tape. This numerical value of S1 is introduced into ECM by the electromagnetic operation of the keys of row K1. The letter Q serves to introduce row K2 of ECM (which carries out multiplication) indicated in both Figs. 30 and 38c. S1 again calls the value recorded on ring S1 and the product is effected, being $x_{n-1} \times x_{n-1} = x^2_{n-1}$; we will suppose that this square is obtained in the totalizer T1 of ECM, the totalizer being under the control of letter W. The inscription IWS2, like IWS of Fig. 32, serves to record the value given in T1 magnetically on steel ring S2, and therefore S2 will receive the recording of $x^2_{n-1}$ as was planned in the list of steel rings given above.

RS2 QS1 IWS3: These letters, similarly to the operation described above, have the object of effecting the product $x^2_{n-1} \times x_{n-1} = x^3_{n-1}$ which is then recorded on ring S3.

RS3 QS1 IWS4: As above, these inscriptions serve to obtain a recording on ring S4 of the product $$x^3_{n-1} \times x_{n-1} = x^4_{n-1}$$

RS4+S5—IW7: RS4+ transfers the value $x^4_{n-1}$ of ring S4 into totalizer T1, while the order S5— serves to subtract the value 16 (recorded on S5) from $x^4_{n-1}$ in this manner, $x^4_{n-1} - 16 = y_{n-1}$ is obtained in the totalizer T1, and this new value is recorded on ring S7 as a result of the order IW7.

RS3 QS6 IWS8: This group of orders serves to multiply the value $x^3_{n-1}$ of ring S3 by the value 4 of ring S6, thus obtaining in totalizer T1 the value $4x^3_{n-1} = z_{n-1}$, which is then recorded in S8 by the order IWS8.

RS7+S8÷IZS9: This order is similar to that represented in Fig. 31 and already described as an example in the "Operation of the Analytic Calculating Machine." It will be recalled that this order serves to effect division between two numbers; in this case, the value $y_{n-1}$ of S7 is divided by the value $z_{n-1}$ of S8 and the result obtained in totalizer T2 which is under the control of letter Z, is then recorded on ring S9. Ring S9 will thus contain the value $y_{n-1} \div z_{n-1} = x'_{n-1}$.

S1+S9—IWS1: From the value $x_{n-1}$ contained in ring S1, the value $x'_{n-1}$ contained in ring S9 is subtracted, thus obtaining in totalizer T1 the value $x_{n-1} - x'_{n-1} = x_n$, which is immediately recorded again on the same ring S1 cancelling the value recorded previously on it. In other words, $x_n$ takes the place of $x_{n-1}$ on ring S1 and thus everything is ready for another cycle.

RS0+S10+IWS0: Since S0 contains the value 1, and S10 contains the value 1, the operation in question serves to calcuate $1+1=2$ which indicates the beginning of a second cycle corresponding to $n=2$. Thus, in succession, at every complete passage of the paper tape, the values of $x_1, x_2, x_3 \ldots x_n$ are obtained in ring S1, and these values converge towards the value which is being sought of the root X.

While there has been shown and described and pointed out the fundamental novel features of the invention as applied to a single modification it will be understood that various omissions and substitutions and changes in the form and details of the device illustrated and in its operation may be made by those skilled in the art, without departing from the spirit of the invention.

What is claimed is:

1. An analytic calculating machine comprising a group of arithmetical calculating machines each having an electromechanical inscribing means to set values into it and an exploring teleprinter means to read the result furnished by it, relays to determine the machines operated and the natures of their operations, a magnetic numbers storage device consisting of steel ring subdivisions for the separate recording of a plurality of data and numerical results, means to explore and inscribe numerical information in subdivisions of said storage device, relays to select a steel ring and determine whether it is to be explored or inscribed, and a settable command device consisting of a punched paper tape and associated teleprinter circuit for operating all of said relays, exploring means and inscribing means, and for transferring numerical information, in any preselected manner and sequence.

2. An analytic calculating machine as set forth in claim 1 wherein the settable command device includes an element carrying command information, a teleprinter transmitter actuated by said information, and a teleprinter receiver controlled by said transmitter.

3. An analytic calculating machine as set forth in claim 1 wherein the settable command device includes an element carrying command information, a teleprinter transmitter actuated by said information, a teleprinter receiver controlled by said transmitter, and a different teleprinter transmitter and receiver associated with each arithmetical calculating machine.

4. An analytic calculating machine as set forth in claim 1 wherein the settable command device includes a teleprinter receiver having type bars actuated in response to the command information, and a group of electric spring contacts actuable by said type bars, said arithmetical machines having electromagnets for operating their control boards, said spring contacts governing the actuation of said electromagnets, said subdivision-selecting relays including a switching machine, a dialing means for controlling the selection of the switching machine and electromagnets for operating the dialing means, said spring contacts also governing the actuation of the second-named electromagnets.

5. An analytic calculating machine as set forth in claim 1 wherein each arithmetical calculating machine has a set of totalizing drums, and wherein the exploring means associated with each arithmetical calculating machine comprises a movable carriage operating in front of said totalizing drums, said carriage carrying teleprinter means for reading numbers on said drums in the form of code holes.

6. An analytic calculating machine as set forth in claim 1 wherein the numbers storage device includes magnetic heads for magnetically recording, reading and cancelling numbers on the steel rings, and a motor and magnetic clutch for turning said rings.

7. An analytic calculating machine as set forth in claim 1 wherein the numbers storage device comprises a drive shaft, means to turn said shaft at a constant speed, a group of thin flat steel rings, each ring being employed for the magnetic recording of a numerical value that is characterized by an index number which distinguishes the ring, a different electromagnetic clutch associated with each ring for coupling the ring to the shaft so as to turn the ring, the command device including a switching machine for sending current to excite any selected clutch, means to lock any ring in movement once its clutch has been excited, a cam coupled to each ring for deenergizing the associated clutch when the ring has made one complete rotation, means operable by the cam upon a complete rotation of the ring to return the switching machine to normal, and a system of magnetic heads for magnetically recording, reading and cancelling numbers on said rings.

8. An analytic calculating machine as set forth in claim 1 wherein a delay means is provided in the circuit associated with the command device for distributing over a space of time signals from said device to the several arithmetical calculating machines.

9. An analytic calculating machine as set forth in claim 1 wherein the numbers storage device includes magnetic heads for magnetically recording, reading and canceling numbers on steel rings, means to turn said rings, and means to shift said heads radially of the axis of rotation of said rings whereby plural values may be associated with each ring, said last-named means being under the control of said command device and its associated circuit.

10. System for storage-selection of data for calculating machines, comprising a printing telegraph receiver controlled by signals and a printing telegraph transmitter, contacts operated by said receiver, a number storage magazine wherein information is recorded by index numbers, a switching machine for selecting index numbers, a dialling mechanism for said switching machine, said mechanism including a dial plate, means to mount said plate for rotation, a pulsing electromagnet for rotating said plate in small angular increments, relays for pulsing said electromagnet, a selected relay being successively excited in correspondence to each digit of an index number by the contacts operated by the printing telegraph receiver, and means to stop rotation of the dial plate in correspondence to an index number to be dialled, said means including an arm connected to the dial plate and a series of relay deenergizing contacts operated one after another by said arm as the electromagnet is pulsed.

11. System for storage-selection of data for calculating machines as set forth in claim 10 wherein the numbers storage device comprises a drive shaft, means to turn said shaft at a constant speed, a group of thin flat steel rings, each ring being employed for the magnetic recording of a numerical value that is characterized by an index number which distinguishes the ring, a different electromagnetic clutch associated with each ring for coupling the ring to the shaft so as to turn the ring, the command device including the switching machine for sending current to excite any selected clutch, means to lock any ring in movement once its clutch has been excited, a cam coupled to each ring for de-energizing the associated clutch when the ring has made one complete rotation, means operable by the cam upon a complete rotation of the ring to return the switching machine to normal, and a system of magnetic heads for magnetically recording, reading and cancelling numbers of said rings.

12. System for storage-selection of data for calculating machines as set forth in claim 10 wherein the number storage device comprises a group of steel rings having electromagnetic reading and recording heads, wherein the circuit associated with the command device includes the switching machine for connecting in circuit the heads for a selected ring, wherein the reading means are connected with the printing telegraph receiver and the inscribing means are connected with the printing telegraph transmitter, and wherein there are provided an amplifier-rectifier connecting a selected reading head to the receiver, an oscillator-modulator connecting the recording head to the transmitter.

13. System for storage-selection of data for calculating machines as set forth in claim 10, wherein there are provided means to selectively connect the contacts of the telegraph printing receiver to the circuits of the relays controlling the dialling mechanism during the time of the index number signals, recorded on a paper tape, and to other circuits controlling the operation of the calculating machine during the residual time.

14. System for storage-selection of data for calculating machines as set forth in claim 10, wherein there are provided means which make the signals of the printing telegraph transmitter correspond in a code to the position of the means, which give the results of the calculating machine.

References Cited in the file of this patent
UNITED STATES PATENTS

| | | |
|---|---|---|
| 1,876,294 | Hofgaard | Sept. 6, 1932 |
| 2,080,100 | Tauschek | May 11, 1937 |
| 2,172,754 | Lasker et al. | Sept. 12, 1939 |
| 2,207,743 | Larson et al. | July 16, 1940 |
| 2,302,009 | Dickinson | Nov. 17, 1942 |
| 2,340,809 | Hatton et al. | Feb. 1, 1944 |
| 2,355,281 | Dickinson | Aug. 8, 1944 |
| 2,355,282 | Dickinson | Aug. 8, 1944 |
| 2,407,411 | Folis | Sept. 10, 1946 |
| 2,434,681 | Williams | Jan. 20, 1948 |
| 2,480,981 | Thierfelder | Sept. 6, 1949 |
| 2,587,532 | Schmidt | Feb. 26, 1952 |
| 2,604,262 | Phelps et al | July 22, 1952 |
| 2,652,196 | Sterling | Sept. 15, 1953 |

FOREIGN PATENTS

| | | |
|---|---|---|
| 113,649 | Australia | Aug. 21, 1941 |
| 115,345 | Australia | June 25, 1942 |
| 331,182 | Great Britain | June 24, 1930 |

OTHER REFERENCES

A Relay Computer for General Application, by S. B. Williams, Bell Laboratories Record, vol. 25, No. 2, February 1947, pp. 49–54.